US009090823B2

(12) United States Patent
Goetz et al.

(10) Patent No.: US 9,090,823 B2
(45) Date of Patent: *Jul. 28, 2015

(54) LIQUID CRYSTAL DISPLAY

(71) Applicant: Merck Patent GmbH, Darmstadt (DE)

(72) Inventors: Achim Goetz, Alsbach-Haehnlein (DE); Melanie Klasen-Memmer, Heuchelheim (DE); Stephan Derow, Griesheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,272

(22) Filed: Jul. 26, 2013

(65) Prior Publication Data

US 2013/0306910 A1    Nov. 21, 2013

Related U.S. Application Data

(62) Division of application No. 13/141,256, filed as application No. PCT/EP2009/008443 on Nov. 26, 2009, now Pat. No. 8,545,720.

(30) Foreign Application Priority Data

Dec. 22, 2008    (DE) .......................... 10 2008 064 170

(51) Int. Cl.
| C09K 19/30 | (2006.01) |
| C09K 19/34 | (2006.01) |
| C09K 19/52 | (2006.01) |
| C09K 19/06 | (2006.01) |
| C09K 19/02 | (2006.01) |
| C09K 19/00 | (2006.01) |
| C09K 19/42 | (2006.01) |
| C09K 19/04 | (2006.01) |
| C09K 19/54 | (2006.01) |

(52) U.S. Cl.
CPC ......... *C09K 19/3028* (2013.01); *C09K 19/3048* (2013.01); *C09K 19/42* (2013.01); *C09K 2019/0407* (2013.01); *C09K 2019/0411* (2013.01); *C09K 2019/0448* (2013.01); *C09K 2019/301* (2013.01); *C09K 2019/3009* (2013.01); *C09K 2019/3016* (2013.01); *C09K 2019/548* (2013.01); *Y10T 428/10* (2015.01)

(58) Field of Classification Search
CPC ............... C09K 19/42; C09K 19/3028; C09K 19/3048; C09K 2019/0407; C09K 2019/0411; C09K 2019/0448; C09K 2019/3009; C09K 2019/301; C09K 2019/3016; C09K 2019/548; Y10T 428/10
USPC ............... 252/299.01, 299.6, 299.61, 299.63; 428/1.1; 349/182, 183
See application file for complete search history.

(56) References Cited

U.S. PATENT DOCUMENTS

| 6,217,953 | B1 | 4/2001 | Heckmeier et al. | |
| 6,329,027 | B1 | 12/2001 | Kondo | |
| 6,576,303 | B1 | 6/2003 | Tamura | |
| 7,807,068 | B2 | 10/2010 | Bremer | |
| 8,114,310 | B2 | 2/2012 | Bernatz | |
| 8,545,720 | B2 * | 10/2013 | Goetz et al. | 252/299.63 |
| 8,617,419 | B2 * | 12/2013 | Ohgiri et al. | 252/299.62 |
| 2004/0011996 | A1 | 1/2004 | Klasen-Memmer | |
| 2006/0198968 | A1 | 9/2006 | Goto | |
| 2008/0236727 | A1 | 10/2008 | Hsieh et al. | |
| 2009/0103042 | A1 | 4/2009 | Fujita | |
| 2009/0264683 | A1 | 10/2009 | Goto | |
| 2009/0278089 | A1 | 11/2009 | Saito et al. | |
| 2009/0324854 | A1 | 12/2009 | Masukawa | |
| 2011/0198536 | A1 | 8/2011 | Saito et al. | |
| 2011/0198537 | A1 | 8/2011 | Furusato et al. | |
| 2011/0248215 | A1 | 10/2011 | Yamashita et al. | |
| 2011/0272631 | A1 | 11/2011 | Saito | |
| 2012/0182516 | A1 * | 7/2012 | Taugerbeck et al. | 349/183 |
| 2012/0224124 | A1 * | 9/2012 | Goetz et al. | 349/84 |
| 2013/0093975 | A1 * | 4/2013 | Taugerbeck et al. | 349/56 |

FOREIGN PATENT DOCUMENTS

| CN | 101045866 | 10/2007 |
| EP | 8908633 | 9/1989 |
| EP | 0959060 | 11/1999 |
| EP | 1378557 | 1/2004 |
| EP | 1975220 | 10/2008 |
| EP | 2308950 | 7/2009 |
| EP | 2319898 | 5/2011 |
| EP | 2325280 | 5/2011 |
| EP | 2305627 | 6/2011 |
| EP | 2351808 | 8/2011 |

(Continued)

OTHER PUBLICATIONS

English Abstract of CN 101045866. Title: "Liquid crystal material useful for manufacturing liquid crystal panel, comprises multiple monomers capable of polymerizing, and specific liquid crystal molecules". Inventor: Zhong-jing Xie et al. Application No. CN200710096970A. Filing Date: Apr. 23, 2007, Applicant: Youda Photoelectric Co Ltd., (6 pages) (Thomson Innovation Record Review).

English Abstract of JP 2010037476. Title: "Liquid-crystal display, has negative dielectric constant anisotropy, and contains fluorine-containing cyclohexyl compound as primary component, and fluorine-containing bicyclohexyl compound as secondardy component". Inventor: Kibe Shigeru et al. Applicant: Chisso Corp. Application No. JP2008204052A. Filing Date: Aug. 7, 2008. (23 pages) (Thomson Innovation Record Review).

(Continued)

*Primary Examiner* — Geraldina Visconti
(74) *Attorney, Agent, or Firm* — Millen, White, Zelano & Branigan, P.C.

(57) ABSTRACT

The present invention relates to liquid-crystal (LC) media for use in LC displays of the PS (polymer stabilized) or PSA (polymer sustained alignment) type.

15 Claims, No Drawings

(56) References Cited

FOREIGN PATENT DOCUMENTS

| | | |
|---|---|---|
| EP | 2360228 | 8/2011 |
| JP | 2008273957 | 11/2008 |
| JP | 2008285570 | 11/2008 |
| JP | 2009270026 | 11/2009 |
| JP | 201037406 | 2/2010 |
| JP | 201037428 | 2/2010 |
| JP | 201037476 | 2/2010 |
| JP | 201037510 | 2/2010 |
| JP | 201059221 | 3/2010 |
| JP | 5392256 | 10/2013 |
| WO | 2009150966 | 12/2009 |
| WO | 2009157313 | 12/2009 |
| WO | 2010029843 | 3/2010 |
| WO | 2010032587 | 3/2010 |
| WO | 2010044334 | 4/2010 |
| WO | 2010047206 | 4/2010 |
| WO | 2010067662 | 6/2010 |
| WO | 2010070979 | 6/2010 |

OTHER PUBLICATIONS

English Abstract of JP 2010037510A. Title: "Liquid-crystal composition for display, has negative dielectric constant anisotropy, and contains fluorine-containing cyclohexyl compound as primary component, and fluorine-containing bicyclohexyl compound as secondary component". Inventor: Kibe Shigeru et al. Applicant: Chisso Corp. Application No. JP2008205236A. Filing Date: Aug. 8, 2008. (23 pages) (Thomson Innovation Record Review).

English Abstract of JP2008285570. Title: "Liquid-crystal display unit, contains fluorine-containing benzene compounds, and cyclohexane-containing compound, and has negative dielectric constant anisotropy". Inventor: Saito Masayuki. Applicant: Chisso Corp. Application No. JP2007131098A. Filing Date: May 17, 2007. (21 pages) (Thomson Innovation Record Review).

English Abstract JP2008273957. Title: "Novel alkadienyl group containing compound for liquid crystal composition used for liquid crystal element such as verticallt aligned liquid crystal display an dynamic scattering mode liquid crystal display". Inventor: Yamashita Junichi. Applicant: Chisso Corp. Application No. JP200896799A. Filing Date: Apr. 3, 2008. (44 pages) (Thomson Innovation Record Review).

World IP Organization. "International Search Report". PCT/EP2009/008443, Applicant: Merck Patent GmbH, Mailed: Mar. 4, 2010.

English Translation of Search Report cited in the corresponding Taiwanese Patent Application No. 098143741. Search Report completed on Jul. 24, 2014.

* cited by examiner

LIQUID CRYSTAL DISPLAY

The present invention relates to liquid-crystal (LC) media for use in LC displays of the PS (polymer-stabilised) or PSA (polymer-sustained alignment) type.

The liquid-crystal displays (LC displays) used at present are usually those of the TN (twisted nematic) type. However, these have the disadvantage of a strong viewing-angle dependence of the contrast. In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place. Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays. Also known are IPS (in-plane switching) displays, which contain an LC layer between two substrates, only one of which has an electrode layer, usually with a comb-shaped structure. On application of a voltage, an electric field which has a significant component parallel to the LC layer is thereby generated. This causes a realignment of the LC molecules in the layer plane. Furthermore, so-called FFS (fringe-field switching) displays have been proposed (see, inter alia. S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are demanded.

A further development are the so-called PS (polymer-stabilised) displays, which are also known under the term "PSA" (polymer-sustained alignment). In these, a small amount (for example 0.3%, typically <1%) of a polymerisable compound is added to the LC medium and, after introduction into the LC cell, is polymerised or crosslinked in situ, usually by UV photopolymerisation, with or without an electrical voltage applied between the electrodes. The addition of polymerisable mesogenic or liquid-crystalline compounds, also known as "reactive mesogens" (RMs), to the LC mixture has proven particularly suitable. In the meantime, the PSA principle is being used in diverse classical LC displays. Thus, for example, PSA-VA, PSA-OCB, PS-iPS/FFS and PS-TN displays are known. The in-situ polymerisation of the polymerisable compound(s) usually takes place, for example, with an applied electrical voltage in the case of PSA-VA displays, with or without an applied electrical voltage in the case of PSA-IPS displays. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 628 A2, EP 1 378 557 A1, EP 1 498 468 A1, US 2004/0191428 A1, US 2006/0066793 A1 and US 2006/0103804 A1 PSA-OCB displays are described, for example, in T.-J-Chen et ah, Jpn. J. Appl. Phys, 45, 2006, 2702-2704 and S. H. Kim, L.-C-Chien. Jpn, J, Appl. Phys. 43, 2004, 7643-7647, PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

In particular for monitor and especially TV applications, optimisation of the response times, but also of the contrast and luminance (thus also transmission) of the LC display continues to be demanded. The PSA method can provide crucial advantages here, in particular in the case of PSA-VA, a shortening of the response times, which correlate with a measurable pretilt in test cells, can be achieved without significant adverse effects on other parameters.

However, it has been found that the LC mixtures and RMs known from the prior art still have some disadvantages on use in PSA displays. Thus, not every desired soluble RM by far is suitable for use in PSA displays, and it is often difficult to find more suitable selection criteria than the direct PSA experiment with pretilt measurement. The choice becomes even smaller if polymerisation by means of UV light without the addition of photoinitiators is desired, which may be advantageous for certain applications. In addition, the LC mixture (also referred to as "LC host mixture" below)+polymerisable component "material system" selected should have the lowest possible rotational viscosity and the best possible electrical properties, with the emphasis here being on the so-called "voltage holding ratio" (VHR or HR). In connection with PSA displays, a high VHR after irradiation with UV light is, in particular, of central importance since UV exposure is a necessary part of the display production process, but naturally also occurs as "normal" exposure in the finished display.

However, the problem arises that not all LC mixture+polymerisable component combinations by far are suitable for PSA displays since, for example, no tilt or an inadequate tilt arises or since, for example, the VHR is inadequate for TFT display applications.

In particular, it would be desirable to have available novel materials for PSA displays which generate a particularly small pretilt angle. Materials which generate a lower pretilt angle during polymerisation for the same exposure time than the materials known to date, and/or through the use of which the (higher) pretilt angle that can be achieved using the known materials can already be achieved after a shorter exposure time would be particularly desirable. The production time (tact time) of the display could thus be shortened and the costs of the production process reduced.

There is thus still a great demand for PSA displays, in particular of the VA and OCB type, and for LC media and polymerisable compounds for use in such displays, which do not have the disadvantages described above or only do so to a small extent and have improved properties. In particular, there is a great demand for PSA displays, and for materials for use in PSA displays, which facilitate a high specific resistance at the same time as a large working-temperature range, short response times, even at low temperatures, and a low threshold voltage, a low pretilt angle, a multiplicity of grey shades, high contrast and a broad viewing angle, and have high values of the voltage holding ratio (VHR) after UV exposure.

The invention has the object of providing novel LC media for use in PSA displays which do not have the disadvantages indicated above or only do so to a reduced extent, enable a low pretilt angle to be established, and preferably at the same time facilitate very high specific resistance values, high VHR values, low threshold voltages and short response times.

This object has been achieved in accordance with the invention by LC media and LC displays as described in the present application. In particular, it has been found, surprisingly, that the use of LC media according to the invention in PSA displays facilitates particularly low pretilt angles and fast establishment of the desired tilt angles. This has been demonstrated in connection with an LC medium by means of pretilt measurements. In particular, a pretilt has been achieved without the addition of photoinitiator. In addition, the materials according to the invention exhibit significantly faster generation of the pretilt angle compared with the materials known from the prior art, as has been demonstrated by exposure time-dependent measurements of the pretilt angle.

The invention relates to the use of LC mixtures comprising one or more compounds of the formula I, preferably in a concentration ≥5%.

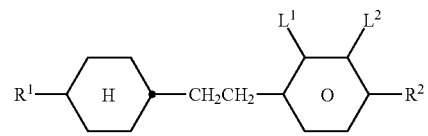

in which the individual radicals have the following meanings:

$R^1$ and $R^2$ each, independently of one another, denote alkyl having 1 to 12 C atoms, in which, in addition, one or two nonadjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_2F$, $CHF_2$, in LC displays of the PS (polymer stabilised) or PSA (polymer sustained alignment) type.

The invention furthermore relates to an LC medium comprising an LC mixture according to the invention as described above and below, and one or more polymerisable compounds, preferably selected from the group consisting of reactive mesogens.

The invention furthermore relates to an LC medium comprising an LC mixture according to the invention as described above and below, and a polymer obtainable by polymerisation of one or more polymerisable compounds, which are preferably selected from the group consisting of reactive mesogens.

The invention furthermore relates to an LC medium comprising a polymerisable component A) comprising one or more polymerisable compounds, preferably selected from reactive mesogens, and a liquid-crystalline component B), also referred to as "LC host mixture" below, consisting of an LC mixture according to the invention comprising one or more compounds of the formula I as described above and below.

The invention furthermore relates to an LC medium comprising a polymer obtainable by polymerisation of a polymerisable component A) comprising one or more polymerisable compounds, preferably selected from reactive mesogens, and a liquid-crystalline component B), also referred to as "LC host mixture" below, consisting of an LC mixture according to the invention comprising one or more compounds of the formula I as described above and below.

The invention furthermore relates to the use of LC mixtures and LC media according to the invention in PS and PSA displays, in particular the use in PS and PSA displays containing an LC medium, for the generation of a tilt angle in the LC medium by in-situ polymerisation of the polymerisable compound(s) in the PSA display, preferably with application of an electric or magnetic field.

The invention furthermore relates to an LC display containing an LC medium according to the invention, in particular a PS or PSA display, particularly preferably a PSA-VA, PSA-IPS or PS-FFS display.

The invention furthermore relates to an LC display of the PS or PSA type comprising an LC cell consisting of two substrates and two electrodes, where at least one substrate is transparent to light and at least one substrate has an electrode, and a layer, located between the substrates, of an LC medium comprising a polymerised component and a low-molecular-weight component, where the polymerised component is obtainable by polymerisation of one or more polymerisable compounds in the LC medium between the substrates of the LC cell, preferably with application of an electrical voltage to the electrodes, where the low-molecular-weight component is an LC mixture according to the invention as described above and below.

The invention furthermore relates to a process for the preparation of an LC medium according to the invention by mixing one or more low-molecular-weight liquid-crystalline compounds, or an LC mixture according to the invention, with one or more polymerisable compounds, and optionally with further liquid-crystalline compounds and/or additives.

The invention furthermore relates to a process for the production of an LC display according to the invention by mixing an LG mixture according to the invention with one or more polymerisable compounds, and optionally with further liquid-crystalline compounds and/or additives, introducing the resultant mixture into an LC cell having two substrates and two electrodes as described above and below, and polymerising the polymerisable compound(s), preferably with application of an electrical voltage, onto the electrodes.

The PS and PSA displays according to the invention have two electrodes, preferably in the form of transparent layers, which are applied to one or both of the substrates which form the LC cell. Either one electrode is applied to each of the two substrates, as, for example, in PSA-VA, PSA-OCB or PSA-TN displays according to the invention, or the two electrodes are applied to only one of the two substrates, while the other substrate has no electrode, as, for example, in PSA-iPS or PSA-FFS displays according to the invention.

The following meanings apply above and below:

The term "PSA" is, unless indicated otherwise, used to represent PS displays and PSA displays.

The terms "tilt" and "tilt angle" relate to a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value of the tilt angle (i.e. a large deviation from the 90° angle) corresponds to a large tilt. A suitable method for measurement of the tilt angle is given in the examples. Unless indicated otherwise, tilt angle values disclosed above and below relate to this measurement method.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G, Pelzi, S, Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzi, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing a mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

For the purposes of this invention, the term "LC medium" is intended to denote a medium which comprises an LC mixture and one or more polymerisable compounds (such as, for example, reactive mesogens). The term "LC mixture" (or "host mixture") is intended to denote a liquid-crystalline mixture which consists exclusively of unpolymerisable, low-molecular-weight compounds, preferably of two or more liquid-crystalline compounds and optionally further additives, such as, for example, chiral dopants or stabilisers. "Unpolymerisable" means that the compounds are stable or unreactive to a polymerisation reaction, at least under the conditions used for polymerisation of the polymerisable compounds.

Particular preference is given to LC mixtures and LC media which have a nematic phase, in particular a nematic phase at room temperature.

In the compounds of the formula I, it is preferred for both radicals $L^1$ and $L^2$ to denote F or for one of the radicals $L^1$ and $L^2$ to denote F and the other to denote Cl.

The compounds of the formula I are preferably selected from the group consisting of the following sub-formulae:

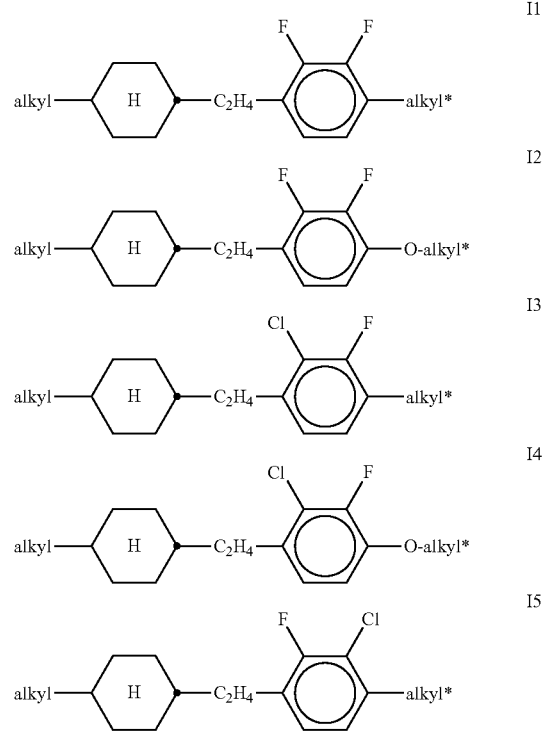

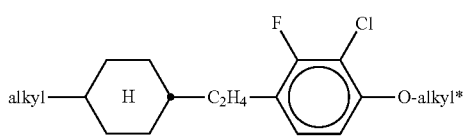
I6 in which alkyl and alkyl* each, independently of one another, denote a straight-chain alkyl radical having 1-12, preferably 1-6, C atoms.

Particular preference is given to compounds of the formulae I1 and I2.

The concentration of compounds of the formula I in the LC mixture is preferably 5 to 50%, particularly preferably 10 to 45%.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl.

Preferred alkenyl groups are, for example, ethenyl, propenyl, butenyl, pentenyl, hexenyl, heptenyl, octenyl.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Further particularly preferred LC mixtures, LC media and LC displays are indicated below:

1) LC mixture which, in addition to the compounds of the formula I, comprises one or more compounds of the formula II and/or III:

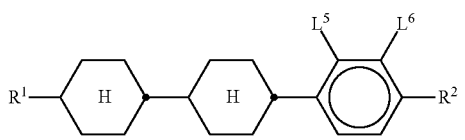
II

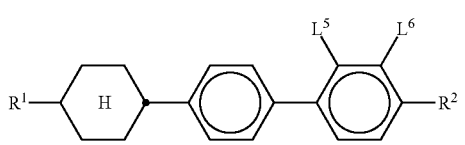
III in which $R^1$ and $R^2$ have the meanings indicated in formula I, and one of the radicals $L^5$ and $L^6$ denotes F and the other denotes Cl.

The compounds of the formula II are preferably selected from the group consisting of the following sub-formulae:

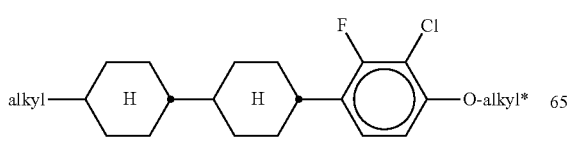
II1

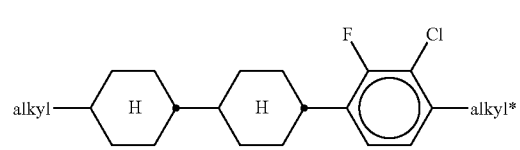
II2

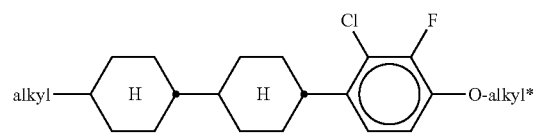
II3

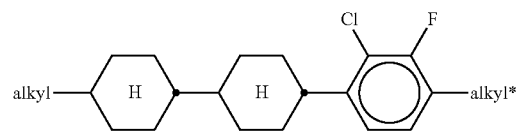
II4 in which alkyl and alkyl* each, independently of one another, denote a straight-chain alkyl radical having 1-12, preferably 1-6, C atoms. Particular preference is given to compounds of the formula II1.

The compounds of the formula III are preferably selected from the group consisting of the following sub-formulae:

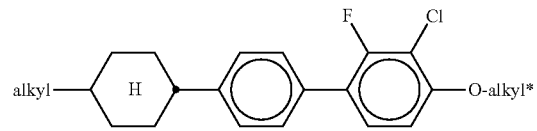
III1

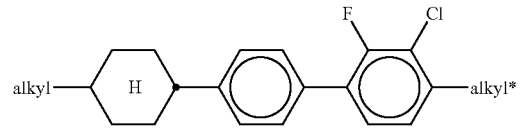
III2

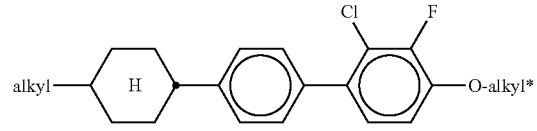
III3

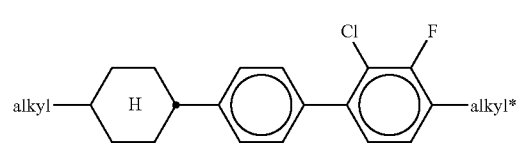
III4 in which alkyl and alkyl* each, independently of one another, denote a straight-chain alkyl radical having 1-12, preferably 1-6, C atoms. Particular preference Is given to compounds of the formula III1.

Particular preference is given to compounds of the formulae II and III and sub-formulae thereof in which $R^1$ denotes n-propyl, n-butyl or n-pentyl, and those in which $R^2$ denotes ethoxy.

The concentration of compounds of the formula II in the LC mixture is preferably 1 to 40%.

The concentration of compounds of the formula III in the LC mixture is preferably 1 to 40%.

The total concentration of compounds of the formulae II and III in the LC mixture is preferably 1 to 50%, particularly preferably 1 to 20%, very particularly preferably 1 to 10%.

2) LC mixture which comprises no compounds, in particular no mesogenic or liquid-crystalline compounds, which contain one or more alkenyl groups or which contain one or more alkyl groups in which one or more CH$_2$ groups have been replaced by CH=CH and optionally additionally by other groups.

3) LC mixture which, in addition to the compounds of the formula I, comprises one or more compounds of the formula IV:

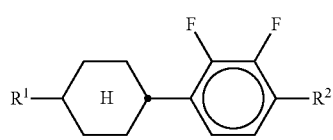

IV in which R$^1$ and R$^2$ have the meanings indicated in formula I and preferably denote alkyl or alkoxy having 1 to 6 C atoms.

The compounds of the formula IV are preferably selected from the following formulae:

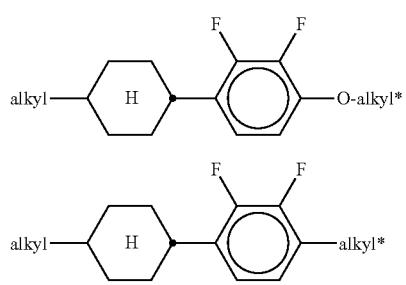

IV1

IV2 in which alkyl and alkyl* each, independently of one another, denote a straight-chain alkyl radical having 1-12, preferably 1-6, C atoms. Particular preference is given to compounds of the formula IV1.

The concentration of compounds of the formula IV in the LC mixture is preferably 1 to 60%.

The total concentration of compounds of the formulae I and IV is preferably ≥10%, particularly preferably 15 to 50%.

4) LC mixture, which, in addition to the compounds of the formula I, comprises one or more compounds of the formula V:

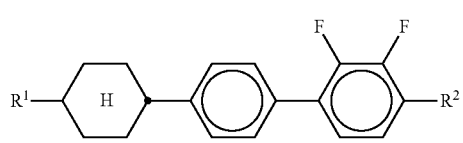

V in which R$^1$ and R$^2$ have the meanings indicated in formula I and preferably denote alkyl or alkoxy having 1 to 6 C atoms.

The compounds of the formula V are preferably selected from the following formulae:

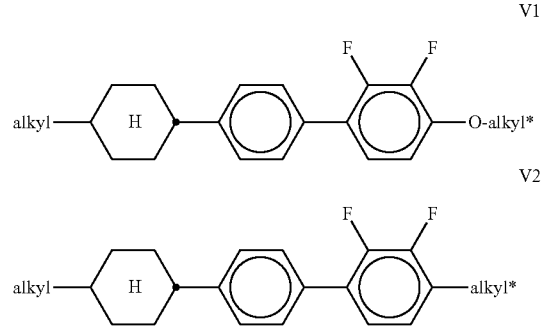

V1

V2

In which alkyl and alkyl* each, independently of one another, denote a straight-chain alkyl radical having 1-12, preferably 1-6, C atoms. Particular preference is given to compounds of the formula VI.

The concentration of compounds of the formula V in the LC mixture is preferably 5 to 50%.

The total concentration of compounds of the formulae I and V is preferably ≥20%, particularly preferably 20 to 80%.

5) LC mixture which, in addition to the compounds of the formula I, comprises one or more compounds of the formula VI:

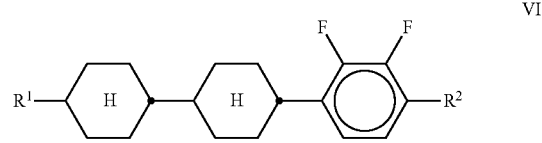

VI in which R$^1$ and R$^2$ have the meanings indicated in formula I and preferably denote alkyl or alkoxy having 1 to 6 C atoms.

The compounds of the formula VI are preferably selected from the following formulae:

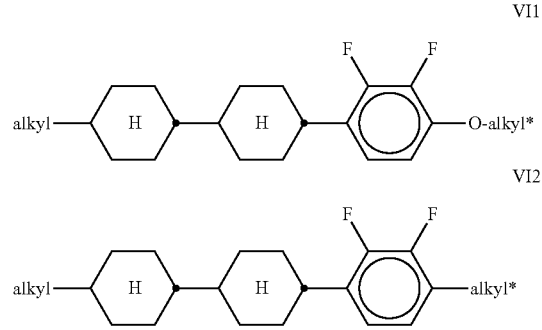

VI1

VI2 in which alkyl and alkyl* each, independently of one another, denote a straight-chain alkyl radical having 1-12, preferably 1-6, C atoms. Particular preference is given to compounds of the formula VI1.

The concentration of compounds of the formula VI in the LC mixture is preferably 5 to 50%.

Particular preference is given to an LC mixture which comprises one or more compounds of the formula I and one or more compounds of the formula V and one or more compounds of the formula VI, where the total concentration of compounds of the formulae I and V and VI is preferably ≥25%, particularly preferably 25 to 80%.

6) LC mixture which comprises no compounds, in particular no mesogenic or liquid-crystalline compounds, which contain one or more chlorine atoms.

7) LC mixture which additionally comprises one or more compounds, different from the compounds of the formulae II, III, IV, V and VI, of the formula CY and/or PY:

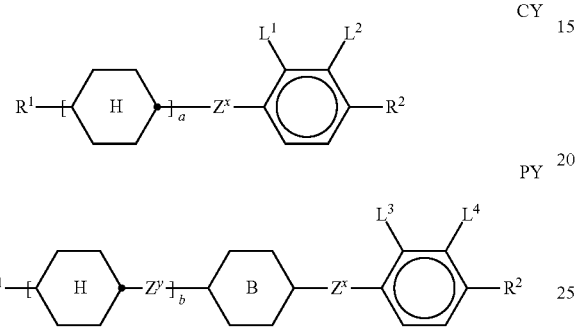

in which the individual radicals have the following meanings:
a denotes 1 or 2,
b denotes 0 or 1,

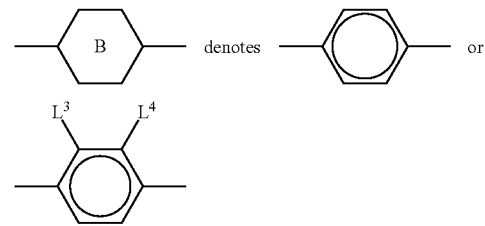

$R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$— or a single bond, preferably a single bond, $L^{1-4}$ each, independently of one another, denote F, Cl, $OCF_3$, $CF_3$, $CH_3$, $CH_2F$, $CHF_2$, Preferably, both radicals $L^1$ and $L^2$ denote F or one of the radicals $L^1$ and $L^2$ denotes F and the other denotes Cl, or both radicals $L^3$ and $L^4$ denote F or one of the radicals $L^3$ and $L^4$ denotes F and the other denotes Cl.

The compounds of the formula CY are preferably selected from the group consisting of the following sub-formulae:

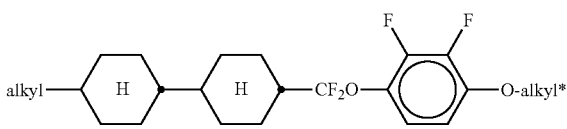

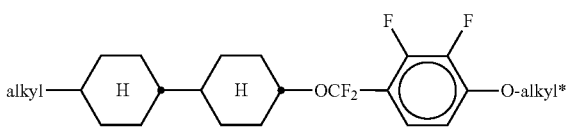

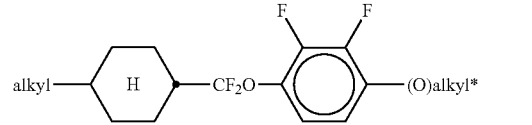

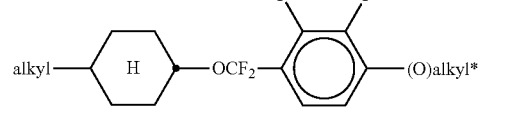

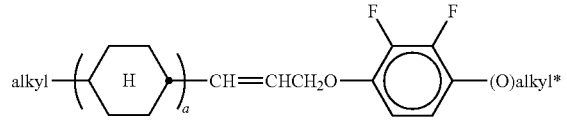

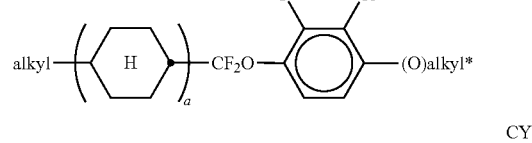

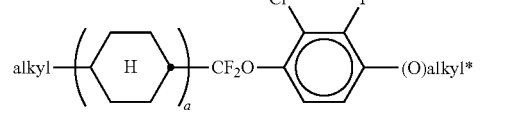

in which a denotes 1 or 2, alkyl and alkyl* each, independently of one another, denote a straight-chain alkyl radical having 1-6 C atoms, and (O) denotes an oxygen atom or a single bond.

The compounds of the formula PY are preferably selected from the group consisting of the following sub-formulae;

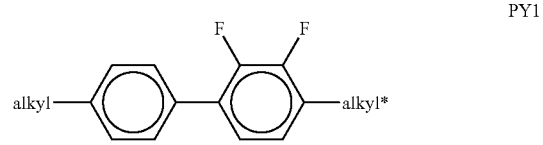

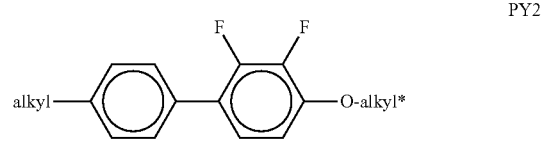

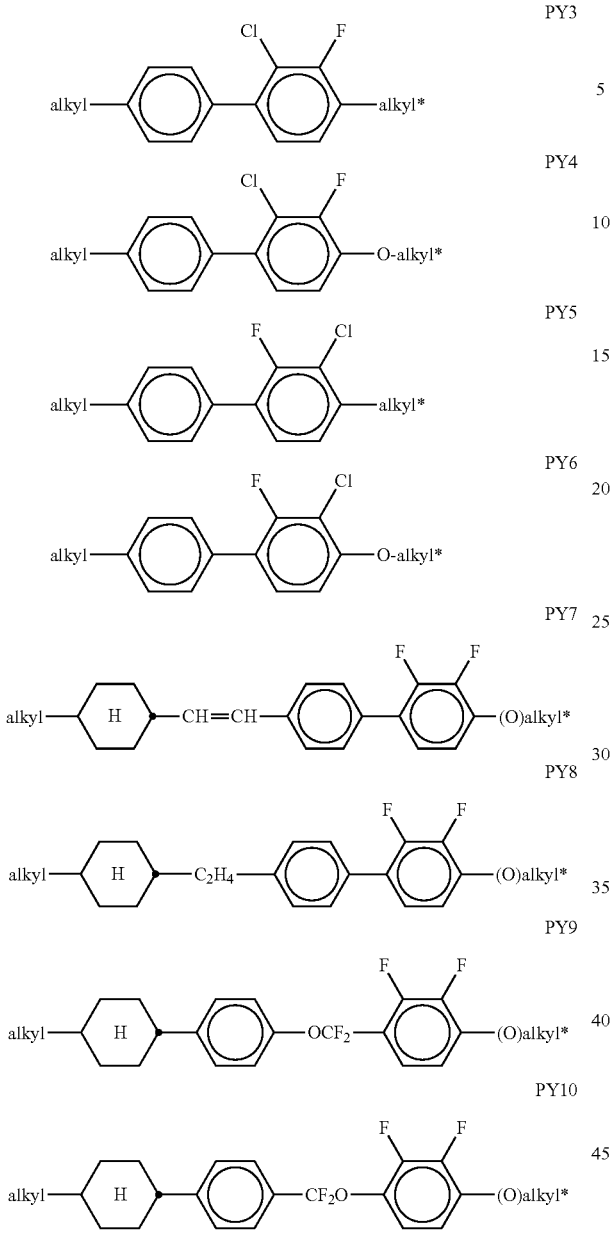

in which alkyl and alkyl* each, independently of one another, denote a straight-chain alkyl radical having 1-6 C atoms, and (O) denotes an oxygen atom or a single bond.

Particular preference is given to compounds of the formula PY1.

8) LC mixture which additionally comprises one or more compounds of the following formula:

in which the individual radicals have the following meanings:

C denotes H,

D denotes H or $R^3$ and $R^4$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —COO, —OCO—, —$C_2F_4$—, —CF=CF—, —$CH=CHCH_2O$— or a single bond, preferably a single bond.

The compounds of the formula ZK are preferably selected from the group consisting of the following sub-formulae:

-continued

ZK8
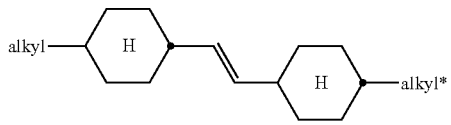

in which alkyl and alkyl* each, independently of one another, denote a straight-chain alkyl radical having 1-6 C atoms.

Particular preference is given to LC mixtures comprising one or more compounds of the formula ZK1 and/or ZK2, preferably in a total concentration of 2 to 40%.

Preference is furthermore given to LC mixtures comprising one or more compounds of the formula ZK3 and/or ZK4, preferably in a total concentration of 1 to 30%.

9) LC mixture which additionally comprises one or more compounds of the following formula:

DK
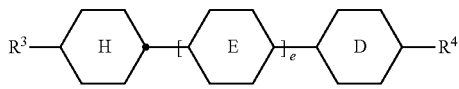

in which the individual radicals on each occurrence, identically or differently, have the following meanings:

$R^3$ and $R^4$ each, independently of one another, have the meanings indicated in formula ZK,

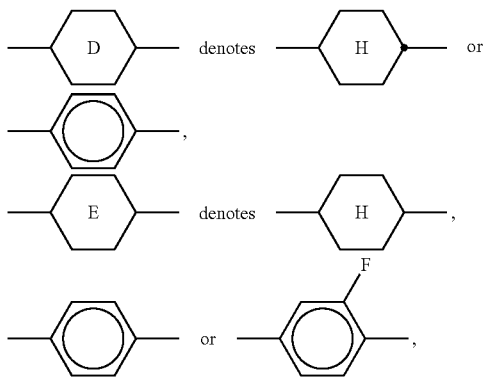

and e denotes 1 or 2.

The compounds of the formula DK are preferably selected from the group consisting of the following sub-formulae:

DK1
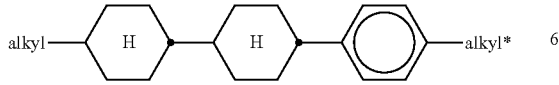

DK2
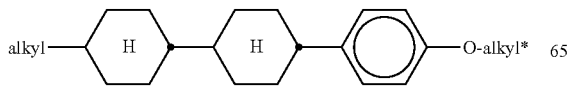

-continued

DK3
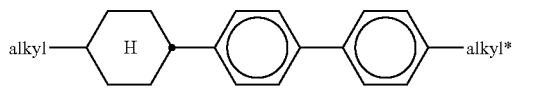

DK4
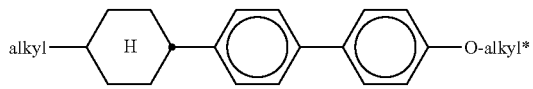

DK5
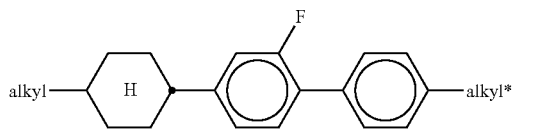

DK6
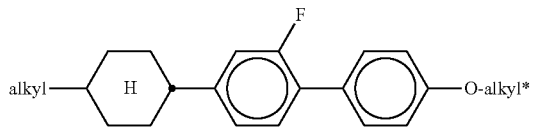

DK7
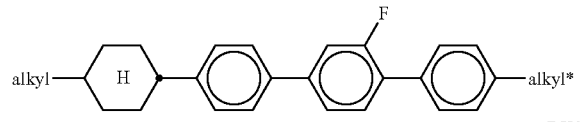

DK8
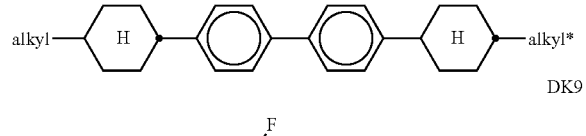

DK9
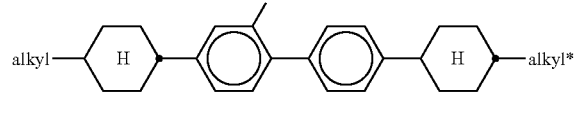

in which alkyl and alkyl* each, independently of one another, denote a straight-chain alkyl radical having 1-6 C atoms.

Particular preference is given to LC mixtures comprising one or more compounds of the formula DK1 and/or DK2, preferably in a total concentration of 2 to 30%.

Preference is furthermore given to LC mixtures comprising one or more compounds of the formula DK3, preferably in a total concentration of 1 to 30%.

10) LC mixture which comprises no compounds of the formula ZK or DK in which $R^3$ and/or $R^4$ denote an alkenyl group or an alkyl group in which one or more $CH_2$ groups have been replaced by —CH=CH— and optionally also additionally by other groups.

11) LC mixture which additionally comprises one or more compounds of the following formula:

LY
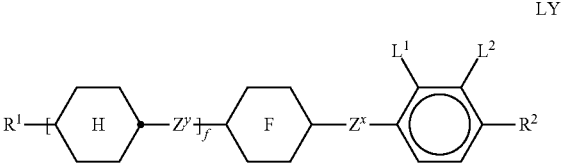

in which the individual radicals have the following meanings:

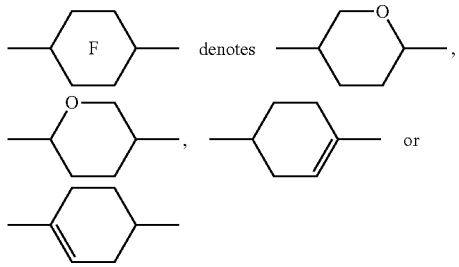

f denotes 0 or 1,

R¹ and R² each, independently of one another, denote alkyl having 1 to 12 C atoms, in which. In addition, one or two non-adjacent CH₂ groups may be replaced by —O—, —CH=CH—, —CO—, —COO— or —COO— in such a way that O atoms are not linked directly to one another, $Z^x$ and $Z^y$ each, independently of one another, denote —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O— or a single bond, preferably a single bond, L¹ and L² each, independently of one another, denote F, Cl, OCF₃, CF₃, CH₃, CH₂F, CHF₂.

Preferably, both radicals L¹ and L² denote F or one of the radicals L¹ and L² denotes F and the other denotes Cl.

The compounds of the formula LY are preferably selected from the group consisting of the following sub-formulae:

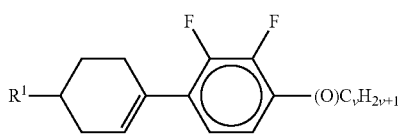
LY1

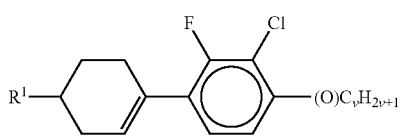
LY2

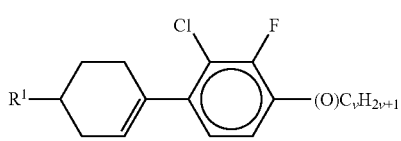
LY3

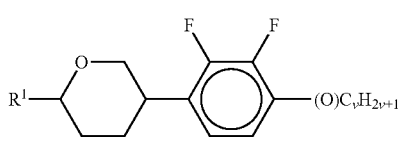
LY4

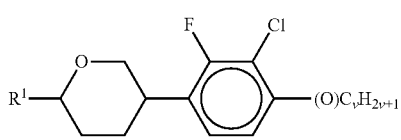
LY5

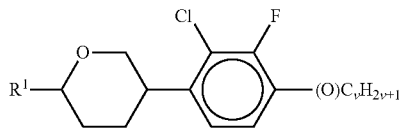
LY6

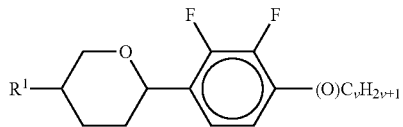
LY7

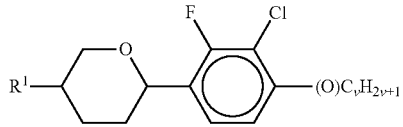
LY8

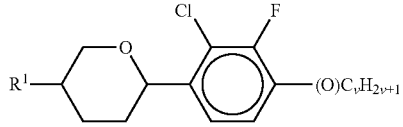
LY9

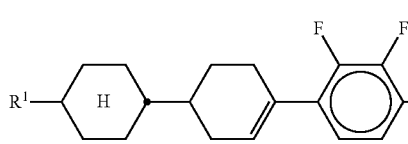
LY10

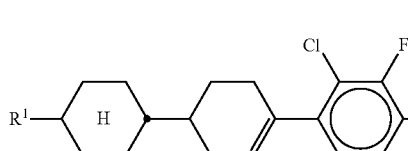
LY11

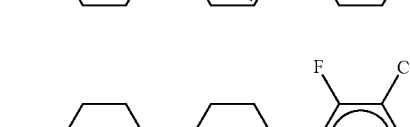
LY12

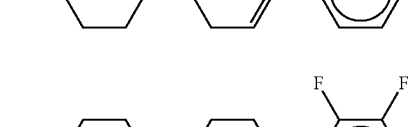
LY13

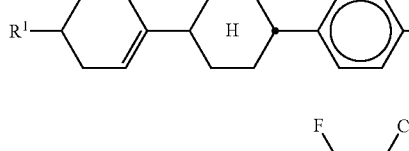
LY14

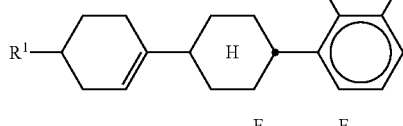
LY15

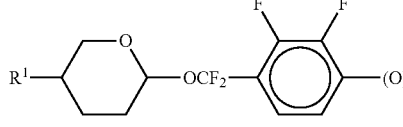
LY16

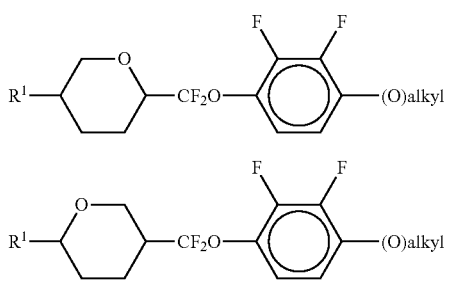

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms.

Particular preference is given to LC mixtures comprising one or more compounds of the formulae LY1-LY9 in a total concentration of 2 to 60%. The concentration of the individual compounds of the formulae LY1-LY9 in the LC mixture is preferably 2 to 20%.

Preference is furthermore given to LC mixtures comprising one or more compounds of the formulae LY10-LY14 in a total concentration of 2 to 30%. The concentration of the individual compounds of the formulae LY10-Y14 in the LC mixture is preferably 2 to 20%.

12) LC mixture which additionally comprises one or more compounds selected from the group consisting of the following formulae:

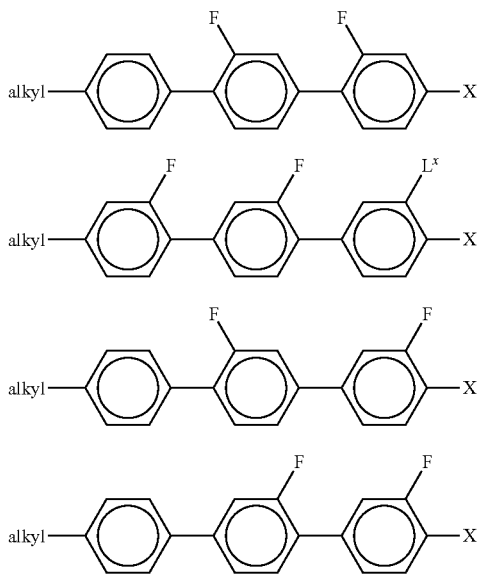

in which alkyl denotes $C_{1-6}$-alkyl, $L^x$ denotes H or F, and X denotes F, Cl, $OCF_3$, $OCHF_2$ or $OCH{=}CF_2$.

Particular preference is given to compounds of the formula G1 in which X denotes F.

13) LC mixture which additionally comprises one or more compounds selected from the group consisting of the following formulae:

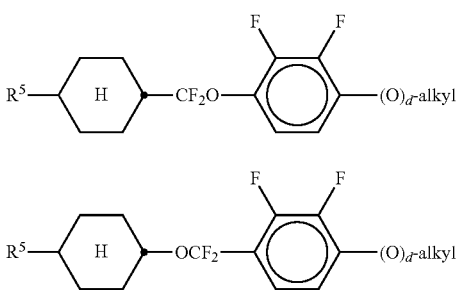

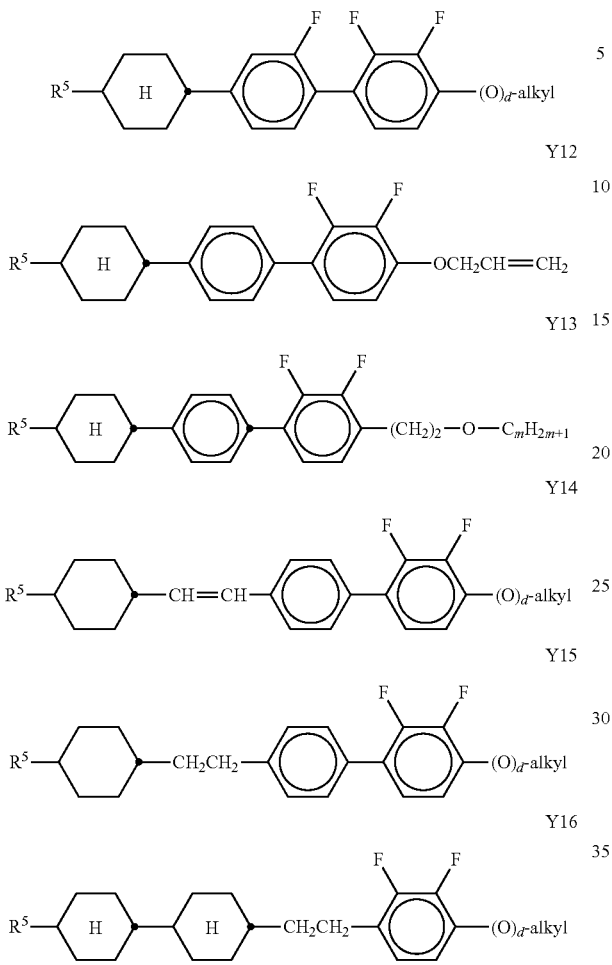

in which $R^5$ has one of the meanings indicated above for $R^5$, alkyl denotes $C_{1-6}$-alkyl, d denotes 0 or 1, and z and m each, independently of one another, denote an integer from 1 to 6. $R^5$ in these compounds is particularly preferably $C_{1-6}$alkyl or -alkoxy or $C_{2-6}$-alkenyl, d is preferably 1. The LC mixture according to the invention preferably comprises one or more compounds of the above-mentioned formulae in amounts of ≥5%.

14) LC mixture which additionally comprises one or more biphenyl compounds of the following formula:

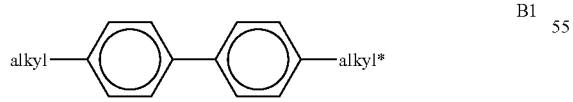

in which alkyl and alkyl* each, independently of one another, denote a straight-chain alkyl radical having 1-6 C atoms.

The proportion of the biphenyls of the formulae B1 to B3 in the LC mixture is preferably at least 3%, in particular ≥5%.

15) LC mixture which additionally comprises one or more terphenyl compounds of the following formula:

in which $R^5$ and $R^6$ each, independently of one another, have one of the meanings indicated above for $R^1$, and

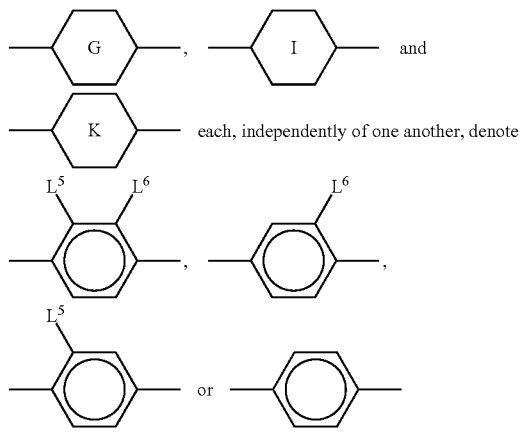

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

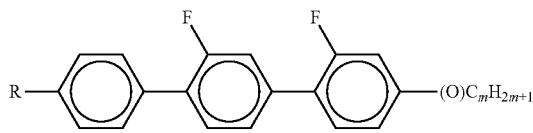

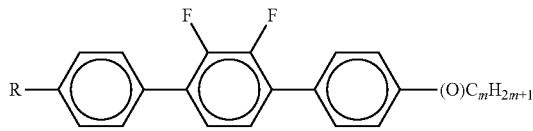

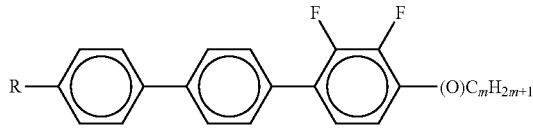

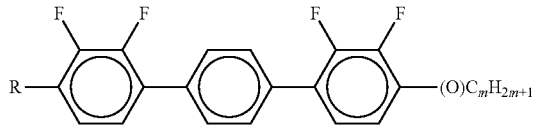

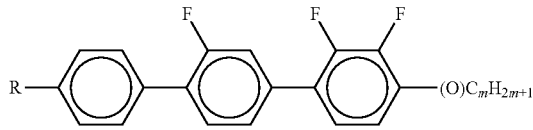

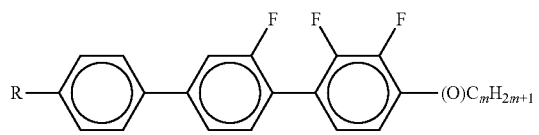
T6

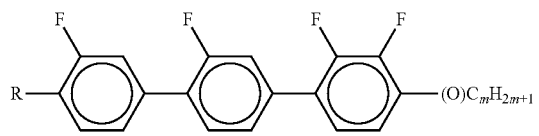
T7

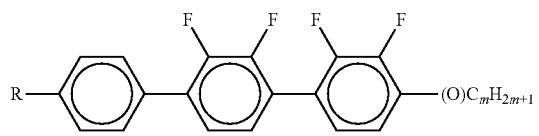
T8

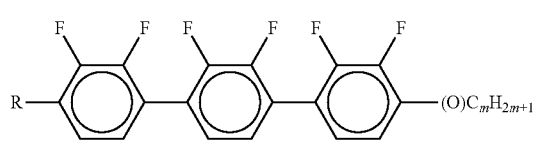
T9

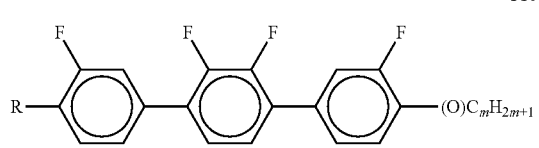
T10

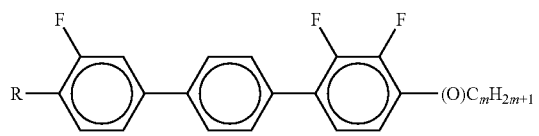
T11

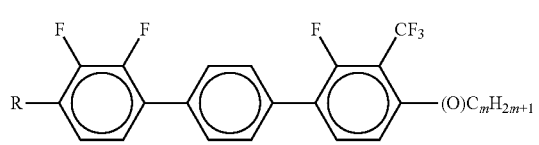
T12

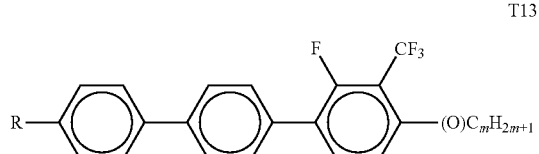
T13

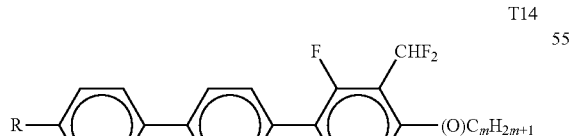
T14

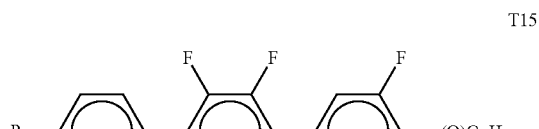
T15

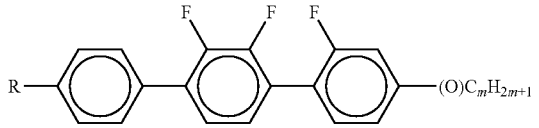
T16

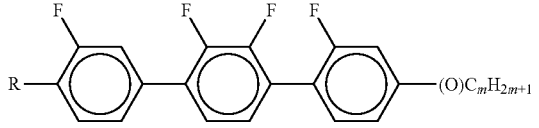
T17

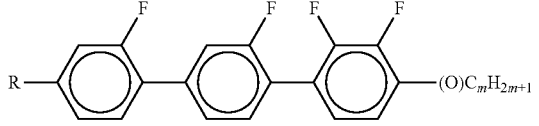
T18

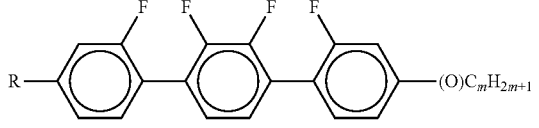
T19

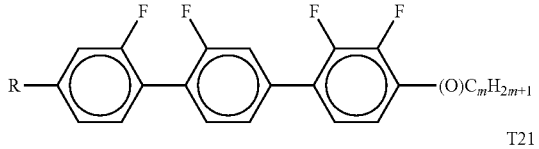
T20

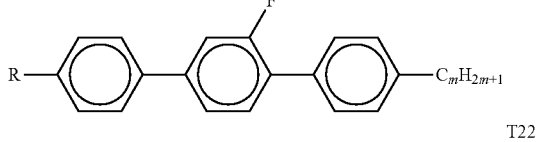
T21

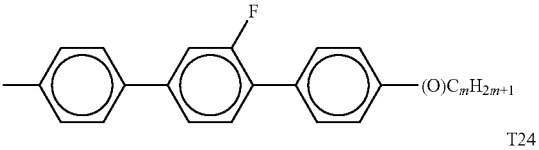
T22

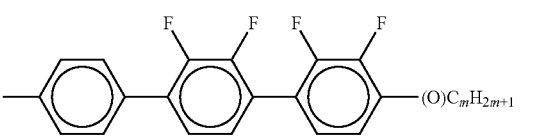
T24 in which R denotes a straight-chain alkyl or alkoxy radical having 1-7 C atoms, (O) denotes an oxygen atom or a single bond, and m denotes an integer from 1 to 6. R preferably denotes methyl, ethyl, propyl, butyl, pentyl, hexyl, methoxy, ethoxy, propoxy, butoxy or pentoxy.

Particular preference is given to compounds of the formulae T1, T2, T3 and T21. In these compounds, R preferably denotes alkyl, furthermore alkoxy, each having 1-5 C atoms.

Preference is furthermore given to LC mixtures comprising one or more compounds of the formula T or sub-formulae thereof in a total concentration of 2 to 50%, particularly preferably 2-30%, very particularly preferably 5-20%.

Preference is furthermore given to LC mixtures comprising one or more compounds of the formula T2, where the concentration of the individual compounds is 2-20%.

Preference is furthermore given to LC mixtures comprising one or more compounds of the formula T3, where the concentration of the individual compounds is 2-10%.

The terphenyls are preferably employed in LC mixtures according to the invention if the Δn value of the mixture is intended to be ≥0.1. Preferred LC mixtures comprise 2-20% of one or more terphenyl compounds of the formula T, preferably selected from the group of compounds T1 to T22.

16) LC mixture which additionally comprises one or more compounds selected from the group consisting of the following formulae:

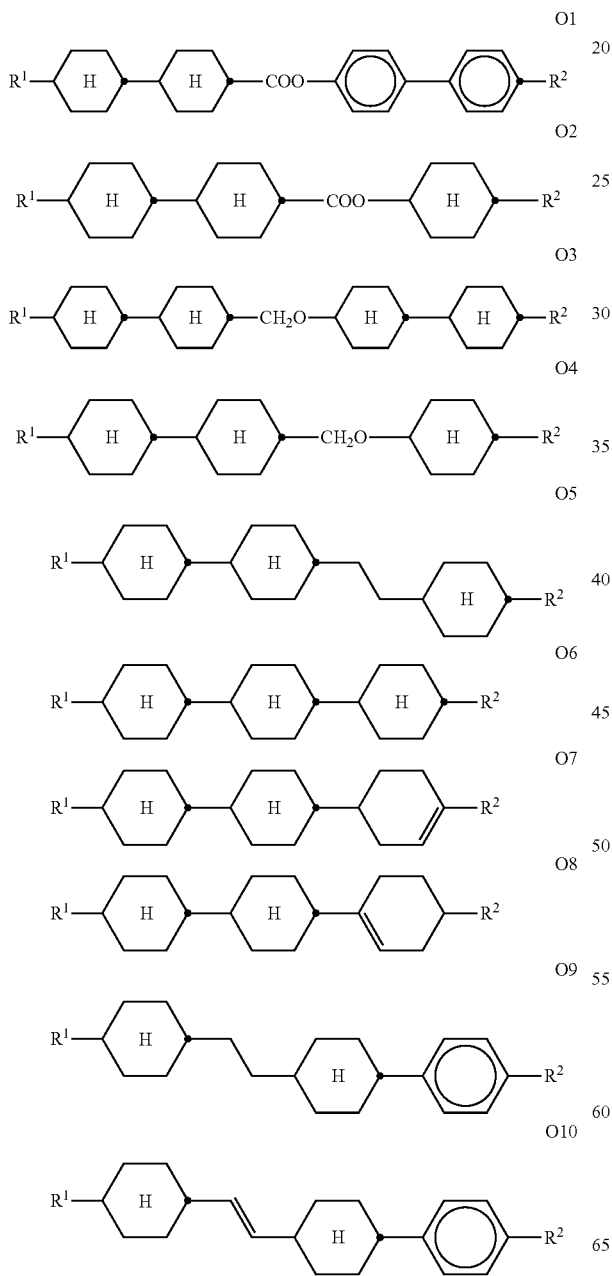

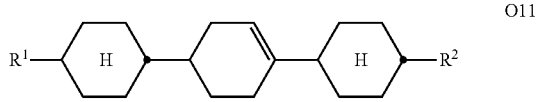

in which $R^1$ and $R^2$ have the meanings indicated above and preferably each, independently of one another, denote straight-chain alkyl having 1 to 6 C atoms, Particular preference is given to LC mixtures comprising one or more compounds of the formula O1 and/or O2.

17) LC mixture which additionally comprises one or more compounds of the following formula:

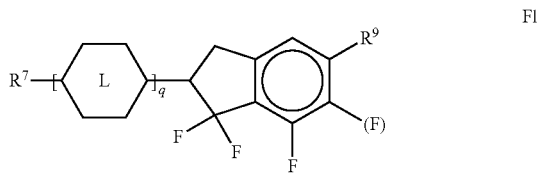

in which

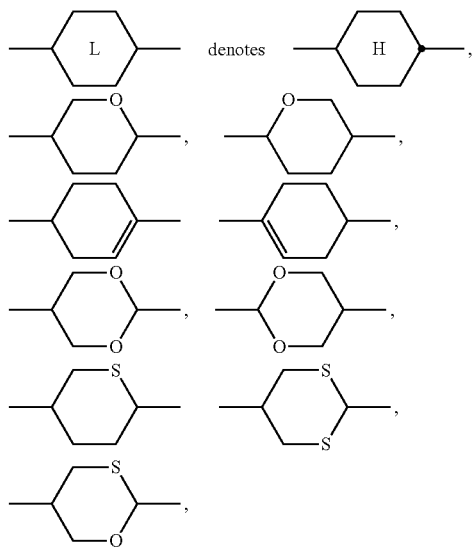

$R^9$ denotes H, $CH_3$, $C_2H_5$ or $n-C_3H_7$, (F) denotes an optional fluorine substituent, and q denotes 1, 2 or 3, and $R^7$ has one of the meanings indicated for $R^1$.

Particularly preferred compounds of the formula FI are selected from, the group consisting of the following sub-formulae;

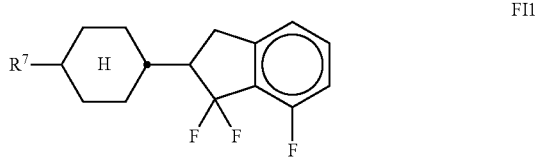

-continued

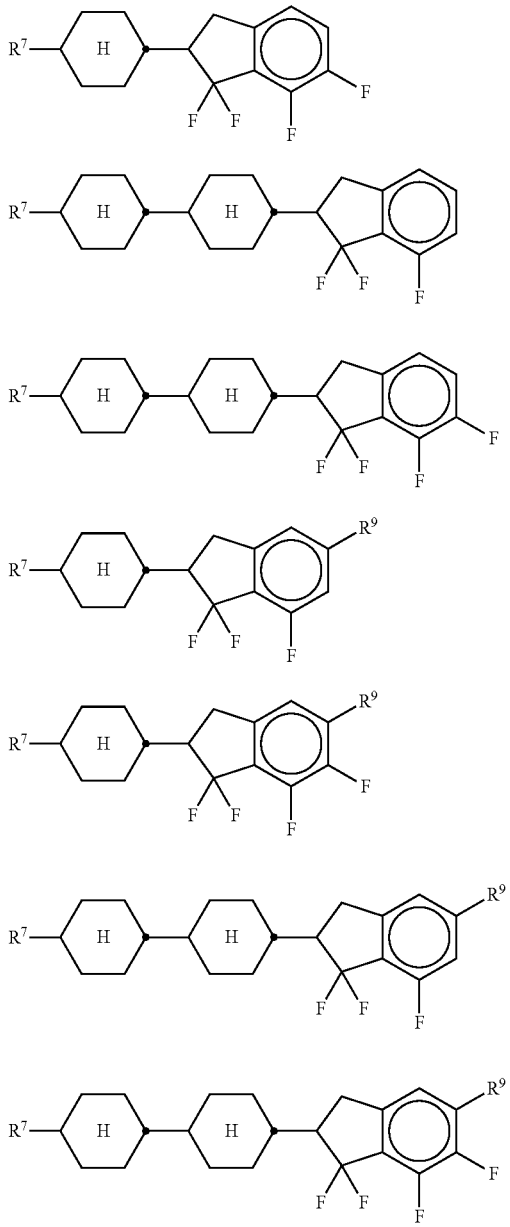

in which $R^7$ preferably denotes straight-chain alkyl, and $R^9$ denotes $CH_3$, $C_2H_5$ or $n\text{-}C_3H_7$. Particular preference is given to the compounds of the formulae FI1, FI2 and FI3. Particular preference is given to LC mixtures comprising one or more compounds of the formula FI in a total concentration of 2 to 30%. The concentration of the individual compounds of the formula FI in the LC mixture is preferably 2 to 15%.

18) LC mixture which additionally comprises one or more compounds selected from the group consisting of the following formulae:

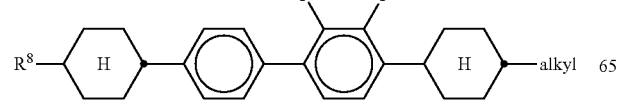

-continued

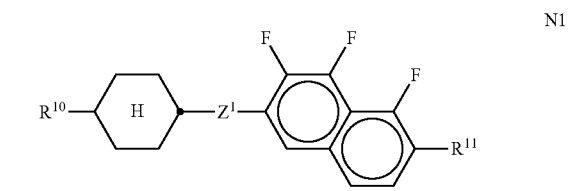

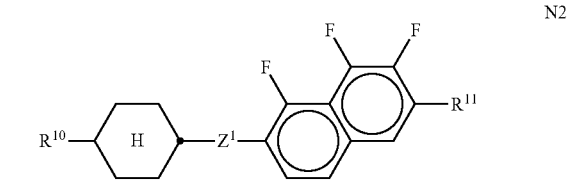

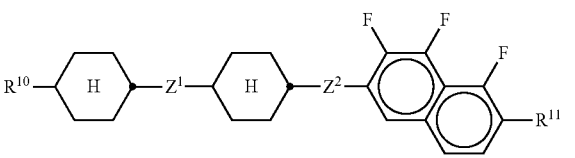

in which $R^8$ has the meaning indicated for $R^1$, and alkyl denotes a straight-chain alkyl radical having 1-6 C atoms.

19) LC mixture which additionally comprises one or more compounds which contain a tetrahydronaphthyl or naphthyl unit, such as, for example, the compounds selected from the group consisting of the following formulae:

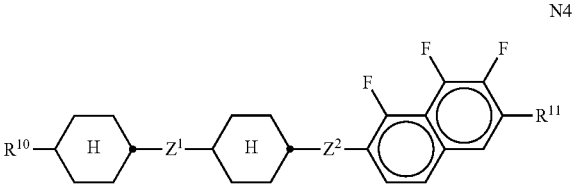

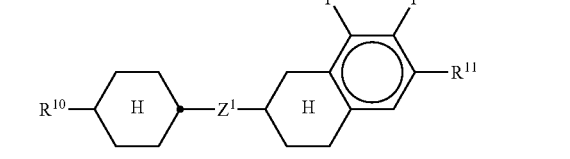

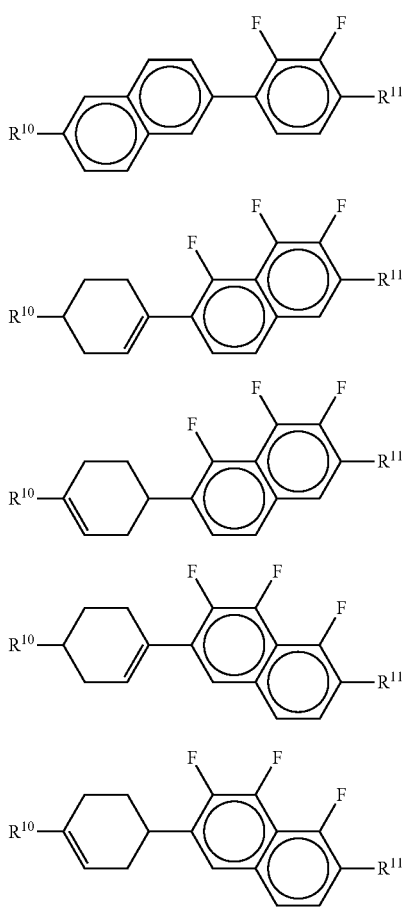

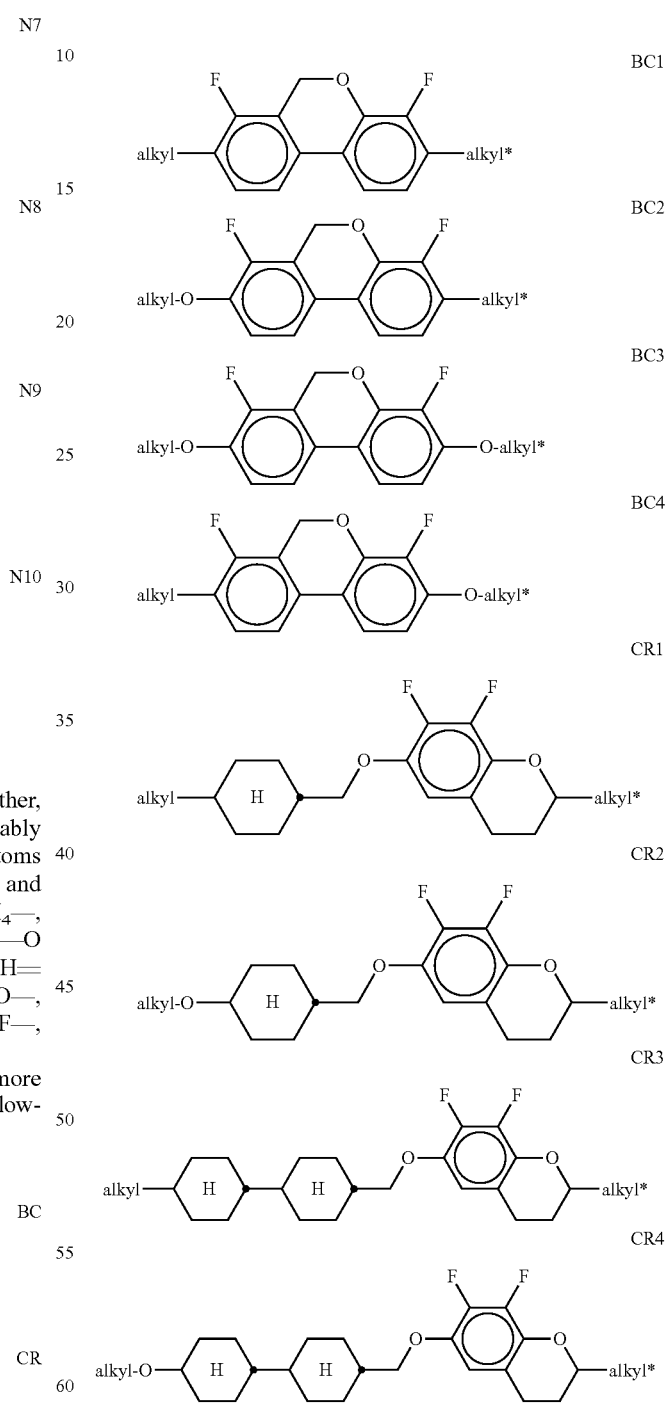

in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —O$(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

20) LC mixture which additionally comprises one or more difluorodibenzochromans and/or chromans of the following formulae:

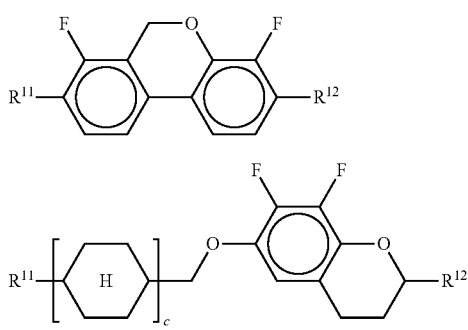

in which $R^{11}$ and $R^{12}$ each, independently of one another, have the meanings indicated above, and c denotes 0 or 1, preferably in amounts of 3 to 20%, in particular in amounts of 3 to 15%.

Particularly preferred compounds of the formulae BC and CR are selected from the group consisting of the following sub-formulae:

in which alkyl and alkyl* each, independently of one another, denote a straight-chain alkyl radical having 1-6 C atoms.

Very particular preference is given to mixtures comprising one, two or three compounds of the formula BC2.

21) LC mixture which additionally comprises one or more fluorinated phenanthrenes and/or dibenzofurans of the following formulae:

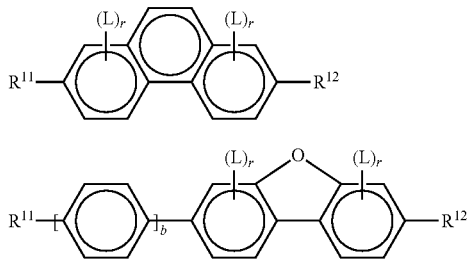

in which $R^{11}$ and $R^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

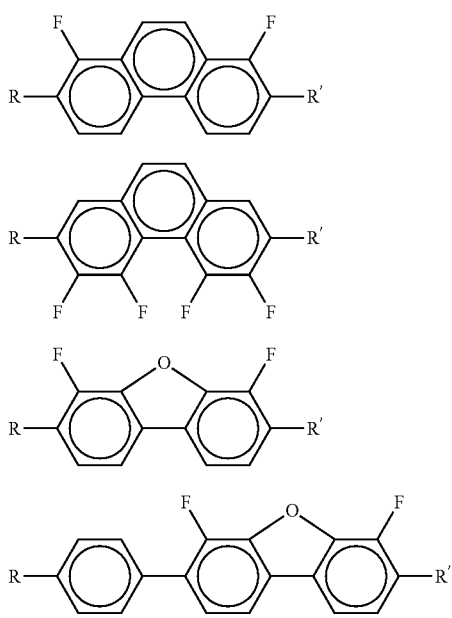

in which R and R' each, independently of one another, denote a straight-chain alkyl or alkoxy radical having 1-7 C atoms.

22) LC mixture which comprises ≥10%, preferably 5 to 50%, particularly preferably 15 to 45%, of one or more compounds of the formula I.
23) LC mixture which comprises one or more compounds of the formulae II and III in a total concentration of 1 to 50%, particularly preferably 1 to 20%, very particularly preferably 1 to 10%.
24) LC mixture which comprises one or more compounds of the formulae I and IV in a total concentration of ≥10%, particularly preferably 10 to 50%.
25) LC mixture which comprises one or more compounds of the formulae I and V in a total concentration of ≥20%, particularly preferably 20 to 80%.
26) LC mixture which comprises one or more compounds of the formula I and one or more compounds of the formula V and one or more compounds of the formula VI. The total concentration of compounds of the formulae I and V and VI in this LC mixture is preferably ≥25%, particularly preferably 25 to 80%.
27) LC medium in which the concentration of the polymerisable component or component A) is ≤5%, preferably ≤1%, particularly preferably ≤0.5%, preferably ≥0.01%, particularly preferably ≥0.1%.
28) LC medium in which the concentration of the liquid-crystalline component (LC mixture) or component B) is ≥25%, particularly preferably ≥99%.
29) LC medium which, apart from the polymerisable compounds of component A), comprises no compounds which contain a terminal vinyloxy group (—O—CH=CH$_2$).
30) PSA-VA display in which the pretilt angle is preferably ≤85°, particularly preferably ≤80°.

The individual components of the preferred embodiments 1)-26) of the LC mixtures according to the invention are either known or their preparation processes can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The combination of LC mixtures of the preferred embodiments 1)-26) indicated above with the polymerised compounds indicated above and below causes low threshold voltages, low rotational viscosities and very good low-temperature stabilities in the LC media according to the invention at the same time as constantly high clearing points and high HR values and allows a particularly low pretilt angle to be established quickly in PSA displays. In particular, the LC media in PSA displays exhibit significantly shortened response times, in particular also the grey-shade response times, compared with the media from the prior art.

The LC mixture preferably has a nematic phase range of at least 80 K, particularly preferably at least 100 K, and a rotational viscosity of not more than 250 mPa·s, preferably not more than 200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules with the longitudinal molecular axes parallel to the electrode surfaces takes place.

LC mixtures according to the invention for use in displays of the VA type have a negative dielectric anisotropy Δε, preferably of −0.5 to −10, in particular −2.5 to −7.5, at 20° C. and 1 kHz.

The birefringence Δn in LC mixtures according to the invention for use in displays of the VA type is preferably below 0.16, particularly preferably between 0.06 and 0.14, in particular between 0.07 and 0.12.

The LC mixtures and LC media according to the invention may also comprise further additives known to the person skilled in the art and described in the literature, such as, for example, polymerisation initiators, inhibitors, stabilisers, surface-active substances or chiral dopants. These may be polymerisable or unpolymerisable. Polymerisable additives are accordingly classed in the polymerisable component or component A). Unpolymerisable additives are accordingly classed in the LC mixture (host mixture) or the unpolymerisable component or component B).

The LC mixtures and LC media may comprise, for example, one or more chiral dopants, preferably selected from the group consisting of compounds from Table B below.

Furthermore, 0 to 15%, preferably 0 to 10%, of one or more additives selected from the group comprising pleochroic dyes, nanoparticles, conductive salts, complex salts and substances for modifying the dielectric anisotropy, the viscosity and/or the alignment of the nematic phases can be added to the LC media. Suitable and preferred conductive salts are, for example, ethyldimethyldodecylammonium 4-hexoxybenzoate, tetrabutylammonium tetraphenylborate or complex salts of crown ethers (cf., for example, Haller et al., Mol. Cryst. Liq. Cryst, 24, 249-258, 1973). Substances of this type are described, for example, in DE-A-22 03 127, DE-A-22 40 864, DE-A-23 21 632, DE-A-23 38 281, DE-A-24 50 088, DE-A-26 37 430 and DE-A-28 53 728.

For the production of PSA displays, the polymerisable compounds are polymerised or crosslinked (if a compound contains two or more polymerisable groups) by in-situ polymerisation in the LC medium between the substrates of the LC display with application of a voltage. The polymerisation can be carried out in one step. It is also possible firstly to carry out the polymerisation in a first step with application of a voltage in order to generate a pretilt angle, and subsequently, in a second polymerisation step, to polymerise or crosslink the compounds which have not reacted in the first step without an applied voltage (end curing).

Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. For example, the commercially available photoinitiators Irgacure651®, Irgacure184®, Irgacure907®, Irgacure369® or Darocure1173® (Ciba AG) are suitable for free-radical polymerisation. If an Initiator is employed, its proportion is preferably 0.001 to 5%, particularly preferably 0.001 to 1%. However, the polymerisation can also be carried out without addition of an initiator. In a further preferred embodiment, the LC medium does not comprise a polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. For example, the commercially available stabilisers from the Irganox® series (Ciba AG), such as, for example, Irganox® 1076, are particularly suitable. If stabilisers are employed, their proportion, based on the total amount of the RMs or the polymerisable component A), is preferably 10-10,000 ppm, particularly preferably 50-500 ppm.

The polymerisable compounds are also suitable for polymerisation without initiator, which is accompanied by considerable advantages, such as, for example, lower materials costs and in particular less contamination of the LC medium by possible residual amounts of the initiator or degradation products thereof.

The LC media according to the invention for use in PSA displays preferably comprise ≤5%, particularly preferably ≤1%, very particularly preferably ≤ 0.5%, and preferably ≥0.01%, particularly preferably ≥0.1%, of polymerisable compounds, in particular polymerisable compounds of the formulae given above and below.

Particular preference is given to LC media comprising one, two or three polymerisable compounds.

Preference is furthermore given to achiral polymerisable compounds and to LC media in which the compounds of component A) and/or B) are selected exclusively from the group consisting of achiral compounds.

Preference is furthermore given to LC media in which the polymerisable component or component A) comprises one or more polymerisable compounds containing one polymerisable group (monoreactive) and one or more polymerisable compounds containing two or more, preferably two, polymerisable groups (di- or multireactive).

Preference is furthermore given to PSA displays and LC media in which the polymerisable component or component A) comprises exclusively polymerisable compounds containing two polymerisable groups (di reactive).

The polymerisable compounds can be added individually to the LC media, but it is also possible to use mixtures comprising two or more polymerisable compounds according to the invention, in the case of polymerisation of such mixtures, copolymers are formed. The invention furthermore relates to the polymerisable mixtures mentioned above and below. The polymerisable compounds can be mesogenic or non-mesogenic. Particular preference is given to polymerisable mesogenic compounds, also known as reactive mesogens (RMs).

Suitable and preferred RMs for use in LC media and PSA displays according to the invention are described below.

In a preferred embodiment of the invention, the polymerisable compounds are selected from formula I*

$$R^a\text{-}A^1\text{-}(Z^1\text{-}A^2)_m\text{-}R^b \qquad \text{I*}$$

in which the individual radicals have the following meanings:
$R^a$ and $R^b$ each, independently of one another, denote P, P-Sp-, H, halogen, $SF_5$, $NO_2$, a carbon group or hydrocarbon group, where at least one of the radicals $R^a$ and $R^b$ denotes or contains a group P or P-Sp-,
P on each occurrence, identically or differently, denotes a polymerisable group,
Sp on each occurrence, identically or differently, denotes a spacer group or a single bond,
$A^1$ and $A^2$ each, independently of one another, denote an aromatic, heteroaromatic, alicyclic or heterocyclic group, preferably having 4 to 25 ring atoms, which may also contain fused rings, and which may also be mono- or polysubstituted by L,
L denotes P-Sp-, H, OH, $CH_2OH$, halogen, $SF_5$, $NO_2$, a carbon group or hydrocarbon group,
$Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, $CR^0R^{00}$ or a single bond,
$R^0$ and $R^{00}$ each, independently of one another, denote H or alkyl having 1 to 12 C atoms,
m denotes 0, 1, 2, 3 or 4,
n1 denotes 1, 2, 3 or 4.

Particularly preferred compounds of the formula I* are those in which
$R^a$ and $R^b$ each, independently of one another, denote P, P-Sp-, H, F, Cl, Br, I, —CN, —NO$_2$, —NCO, —NCS, —OCN, —SCN, $SF_5$ or straight-chain or branched alkyl having 1 to 25 C atoms, in which, in addition, one or more non-adjacent CH$_2$ groups may each be replaced, independently of one another, by —C(R⁰)=C(R⁰⁰)—, —C≡C—, —N(R⁰⁰)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^a$ and $R^b$ denotes or contains a group P or P-Sp-, $A^1$ and $A^2$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH₂ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH₂OH, F, Cl, Br, I, —CN, —NO₂, —NCO, —NCS, —OCN, —SCN, —C(=O)N(Rˣ)₂, —C(=O))Y¹, —C(=O)Rˣ, —N(Rˣ)₂, optionally substituted silyl, optionally substituted aryl having 8 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, Y¹ denotes halogen, Rˣ denotes P, P-Sp-, H, halogen, straight-chain, branched or cyclic alkyl having 1 to 25 C atoms, in which, in addition, one or more non-adjacent CH₂ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I* are selected from the following sub-formulae:

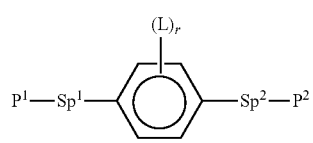
I*1

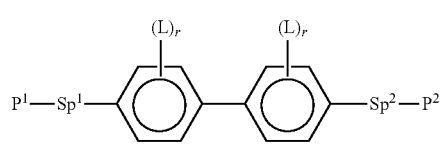
I*2

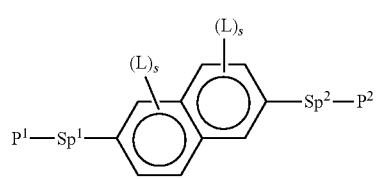
I*3

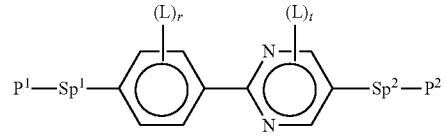
I*4

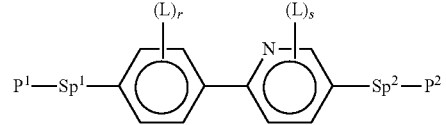
I*5

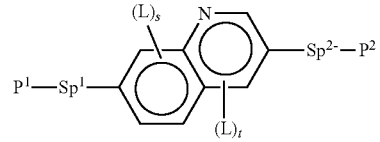
I*6

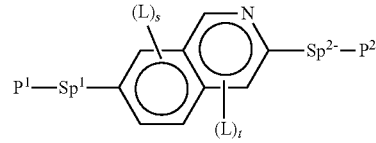
I*7

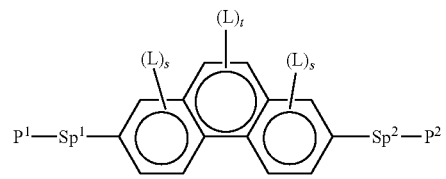
I*8

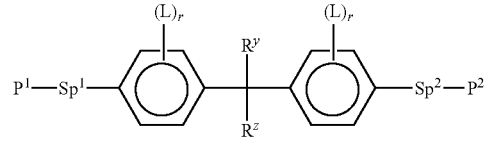
I*9

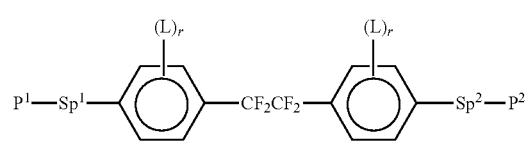
I*10

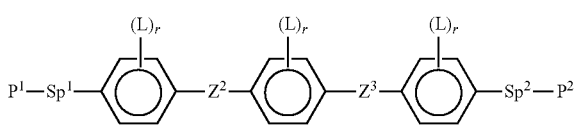
I*11

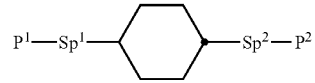
I*12

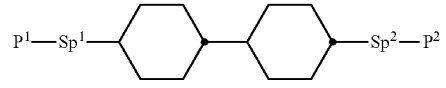
I*13

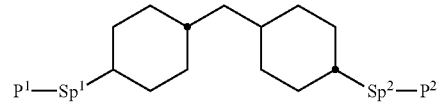
I*14

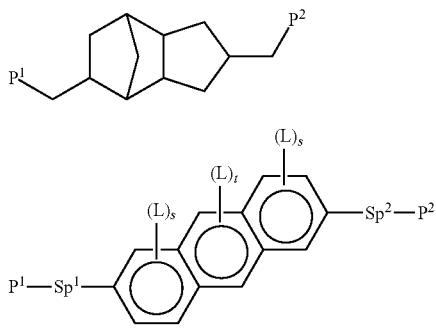

I*15

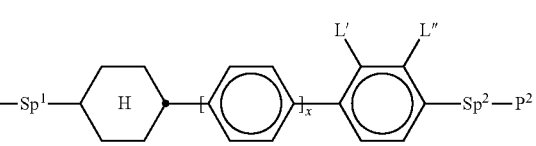

I*16

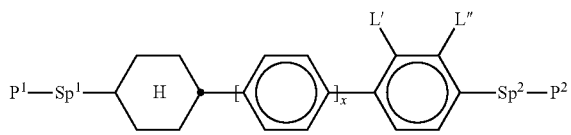

I*17 in which
P¹ and P² have one of the meanings indicated for P and preferably denote acrylate or methacrylate,
Sp¹ and Sp² have one of the meanings indicated for Sp or denote a single bond,
$Z^2$ and $Z^3$ each, independently of one another, denote —COO— or —OCO—,
L has the meaning indicated above for formula I,
L' and L" each, independently of one another, denote H, F or Cl,
r denotes 0, 1, 2, 3 or 4,
s denotes 0, 1, 2 or 3,
t denotes 0, 1 or 2,
x denotes 0 or 1, and
$R^y$ and $R^z$ each, independently of one another, denote H, $CH_3$ or $CF_3$.

In a further preferred embodiment of the invention, the polymerisable compounds are chiral or optically active compounds selected from formula II* (chiral RMs):

$$(R^*-(A^1-Z^1)_m)_k-Q \qquad II^*$$

in which $A^1$, $Z^1$ and m have on each occurrence, identically or differently, one of the meanings indicated in formula I*,
R* has on each occurrence, identically or differently, one of the meanings indicated for $R^1$ in formula I*, where R* can be chiral or achiral,
Q denotes a k-valent chiral group, which is optionally mono- or polysubstituted by L, as defined in formula I*,
k is 1, 2, 3, 4, 5 or 6,
where the compounds contain at least one radical R* or L which denotes or contains a group P or P-Sp- as defined above.

Particularly preferred compounds of the formula II* contain a monovalent group Q of the formula III*

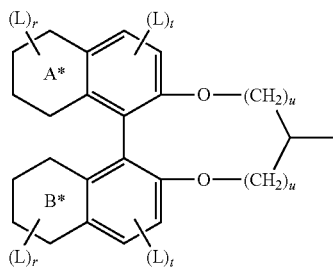

III* in which L and r have on each occurrence, identically or differently, the meanings indicated above,
A* and B* each, independently of one another, denote fused benzene, cyclohexane or cyclohexene,
t on each occurrence, identically or differently, denotes 0, 1 or 2, and
u on each occurrence, identically or differently, denotes 0, 1 or 2.

Particular preference is given to groups of the formula III* in which u denotes 1.

Further preferred compounds of the formula II* contain a monovalent group Q or one or more groups R* of the formula IV*

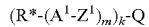

IV* in which
$Q^1$ denotes alkylene or alkyleneoxy having 1 to 9 C atoms or a single bond,
$Q^2$ denotes optionally fluoridated alkyl or alkoxy having 1 to 10 C atoms, in which, in addition, one or two non-adjacent $CH_2$ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another,
$Q^3$ denotes F, Cl, CN or alkyl or alkoxy as defined for $Q^2$, but different from $Q^2$.

Preferred groups of the formula IV* are, for example, 2-butyl (=1-methylpropyl), 2-methylbutyl, 2-methylpentyl, 3-methylpentyl, 2-ethylhexyl, 2-propylpentyl. In particular 2-methylbutyl, 2-methylbutoxy, 2-methylpentoxy, 3-methylpentoxy, 2-methylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methylactoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxyl, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy.

Further preferred compounds of the formula II* contain a divalent group Q of the formula V*

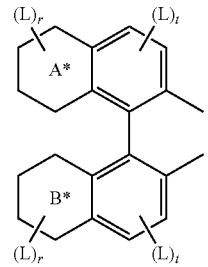

V* in which L, r, t, A* and B* have the meanings indicated above.

Further preferred compounds of the formula II* contain a divalent group Q selected from the following formulae:

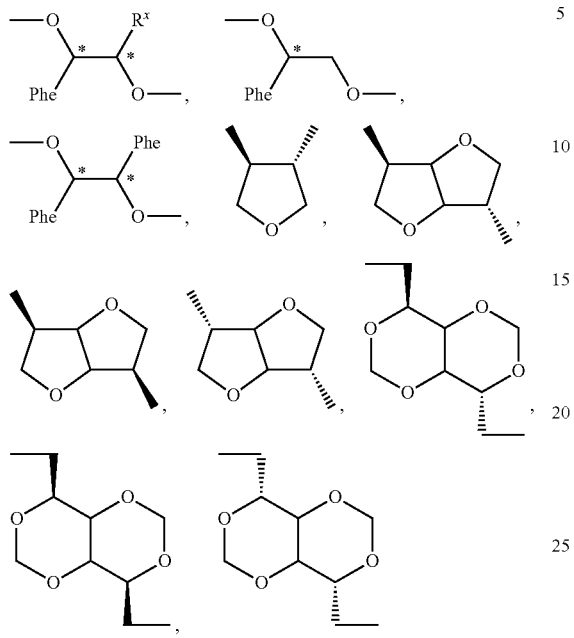

in which Phe denotes phenyl, which is optionally mono- or polysubstituted by L, and $R^x$ denotes F or optionally fluorinated alkyl having 1 to 4 C atoms, Suitable chiral RMs are described, for example, in GB 2 314 839 A, U.S. Pat. No. 8,511,719, U.S. Pat. No. 7,223,450, WO 02/34739 A1, U.S. Pat. No. 7,041,345, U.S. Pat. No. 7,060,331 or U.S. Pat. No. 7,318,950. Suitable RMs containing binaphthyl groups are described, for example, in U.S. Pat. No. 6,818,261. U.S. Pat. No. 6,916,940, U.S. Pat. No. 7,318,950 and U.S. Pat. No. 7,223,450.

The chiral structural elements shown above and below and polymerisable and polymerised compounds containing such chiral structural elements can be employed in optically active form, i.e. as pure enantiomers or as any desired mixture of the two enantiomers, or alternatively as a racemate. The use of racemates is preferred. The use of racemates has some advantages over the use of pure enantiomers, such as, for example, significantly lower synthesis complexity and lower material costs.

Particularly preferred compounds of the formula II* are selected from the following sub-formulae:

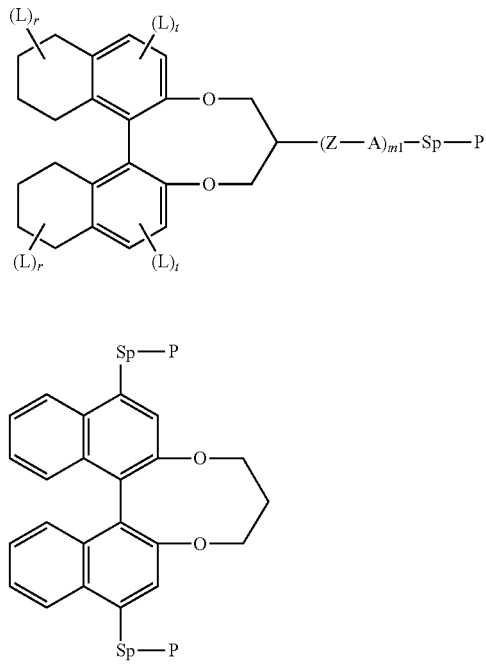

II*1

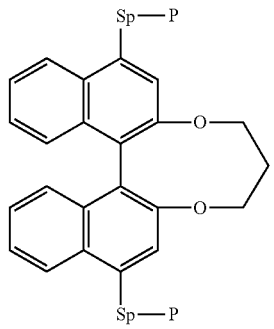

II*2

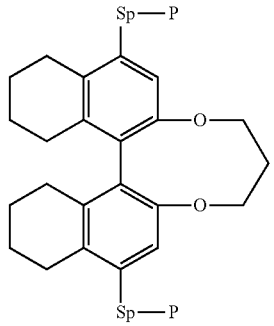

II*3

II*4

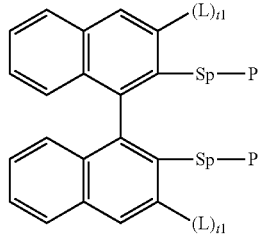

II*5

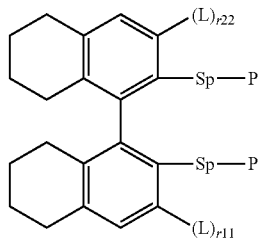

II*6

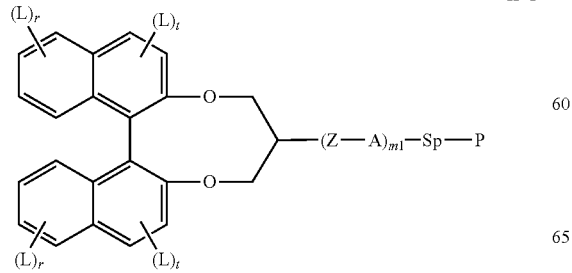

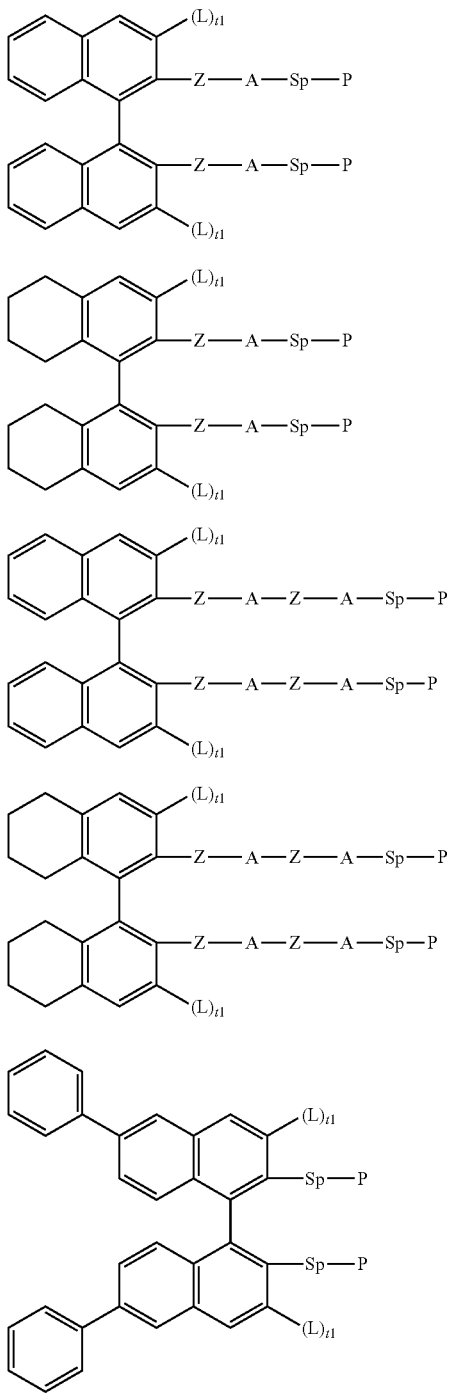

in which L, P, Sp, m, r and t have the meanings indicated above, Z and A have on each occurrence, identically or differently, one of the meanings indicated for $Z^1$ and $A^1$ respectively, and t1 on each occurrence, identically or differently, denotes 0 or 1.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, i or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O— CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno-[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 8-membered groups, such as cyclohexane, silinane, cyclohexene, tetrahydropyran, tetrhydrothiopyran, 1,3-dioxane, 1,3-dithiane, piperidine, 7-membered groups, such as cycloheptane, and fused groups, such as tefrahydronaphthalene, decahydronaphthalene, indane, bicyclo[1.1.1]pentane-1,3-diyl, bicyclo[2.2.2]octane-1,4-diyl, spiro[3,3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br, I, —CN, —$NO_2$, —NCO, —NCS, —OCN, —SCN, —C(=O)N($R^x$)$_2$. —C(=O)$Y^1$, —C(=C)$R^x$, —N($R^x$)$_2$, in which $R^x$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl,

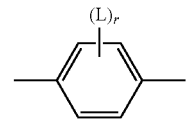

is preferably

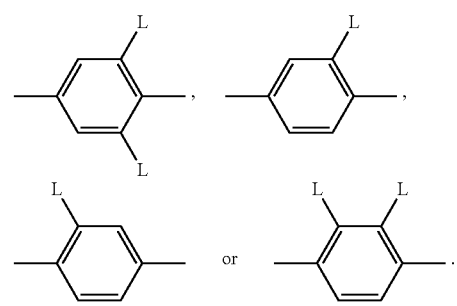

in which L has one of the meanings indicated above.

The polymerisable group P is a group which is suitable for a polymerisation reaction, such as, for example, free-radical or ionic chain polymerisation, polyaddition or poly condensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from $CH_2=CW^1-COO-$, $CH_2=CW^1-CO-$,

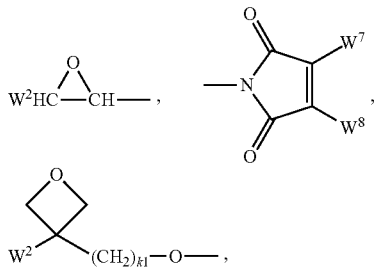

$CH_2=CW^2-(O)_{k3}-$, $CW^1=CH-CO-(O)_{x3}-$, $CW^2=CH-CO-NH-$, $CH_2=CW^2-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH—, HOOC—, OCN— and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are different from P-Sp-, $k_1$, $k_2$ and $k_3$ each, independently of one another, denote 0 or 1, $k_3$ preferably denotes 1.

Particularly preferred groups P are $CH_2=CW^1-COO-$, in particular $CH_2=CH-COO-$, $CH_2=C(CH_3)-COO-$ and $CH_2=CF-COO-$, furthermore $CH_2=CH-O-$, $(CH_2=CH)_2CH-OCO-$, $(CH_2=CH)_2CH-O-$,

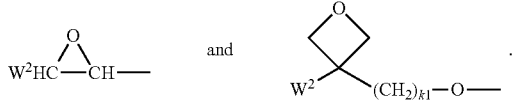

Very particularly preferred groups P are vinyloxy, acrylate, methacrylate, fluoroacrylate, chloroacrylate, oxetane and epoxide, in particular acrylate and methacrylate.

Preferred spacer groups Sp are selected from the formula Sp'-X', so that the radical P-Sp- corresponds to the formula P-Sp'-X'—, where Sp' denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —NR$^0$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, X' denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond, $R^{00}$ and $R^{000}$ each, independently of one another, denote H or alkyl having 1 to 12 C atoms, and $Y^2$ and $Y^3$ each, independently of one another, denote H, F, Cl or CN, X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$NH—CH$_2$CH$_2$— or —(SiR$^{00}$R$^{000}$—O)$_{p1}$—, in which p1 is an integer from 1 to 12, q1 is an integer from 1 to 3, and $R^{00}$ and $R^{000}$ have the meanings indicated above.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, P-Sp- denotes a radical containing two or more polymerisable groups (multifunctional polymerisable radicals). Suitable radicals of this type and polymerisable compounds containing them and the preparation thereof are described, for example, in U.S. Pat. No. 7,060,200 B1 or U.S. 2006/0172090 A1. Particular preference is given to multifunctional polymerisable radicals P-Sp- selected from the following formulae:

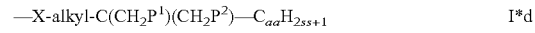
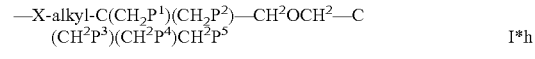
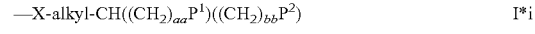
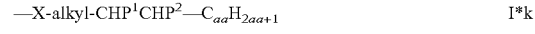
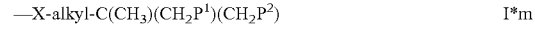

in which alkyl denotes a single bond or straight-chain or branched alkylene having 1 to 12 C atoms, in which one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl or CN, where R$^{00}$ and R$^{000}$ have the meanings indicated above, aa and bb each, independently of one another, denote 0, 1, 2, 3, 4, 5 or 6, X has one of the meanings indicated for X', and P$^{1-5}$ each, independently of one another, have one of the meanings indicated for P.

The polymerisable compounds and RMs can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Further synthetic methods are given in the documents cited above and below. In the simplest case, the synthesis of such RMs is carried out, for example, by esterification or etherification of 2,6-dihydroxynaphthalene or 4,4'-dihydroxybiphenyl using corresponding acids, acid derivatives or halogenated compounds containing a group P, such as, for example, (meth)acryloyl chloride or (meth)acrylic acid, in the presence of a dehydrating reagent, such as, for example, DCC (dicyclohexylcarbodiimide).

The preparation of the LC media which can be used in accordance with the invention is carried out in a manner conventional per se, for example by mixing one or more of the above-mentioned compounds with one or more polymerisable compounds as defined above, and optionally with further liquid-crystalline compounds and/or additives, in general, the desired amount of the components used in smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention, It goes without saying to the person skilled in the art that the LC media according to the invention may also comprise compounds in which, for example, H, N, O, Cl or F have been replaced by the corresponding isotopes.

The structure of the LC displays according to the invention corresponds to the usual geometry for PSA displays, as described in the prior art cited at the outset. Geometries without protrusions are preferred, in particular these in which, in addition, the electrode on the coloured-filter side is unstructured and only the electrode on the TFT side has slits. Particularly suitable and preferred electrode structures for PS-VA displays are described, for example, in U.S. 2006/0066793 A1.

The LC mixtures and LC media according to the invention are in principle suitable for any type of PS or PSA display, in particular those based on LC media of negative dielectric anisotropy, particularly preferably for PSA-VA, PSA-IPS or PS-FFS displays. However, the person skilled in the art will also be able, without inventive step, to employ suitable LC mixtures and LC media according to the invention in other displays of the PS or PSA type which differ from the above-mentioned displays, for example, through their basic structure or through the nature, arrangement or structure of the individual components used, such as, for example, the substrates, alignment layers, electrodes, addressing elements, backlighting, polarisers, coloured filters, compensation films optionally present, etc.

The following examples explain the present invention without restricting it. However, they show the person skilled in the art preferred mixture concepts with compounds preferably to be employed and the respective concentrations thereof and combinations thereof with one another. In addition, the examples illustrate the properties and property combinations that are accessible, The following abbreviations are used:

(n, m, z: in each case, independently of one another, 1, 2, 3, 4, 5 or 6)

TABLE A

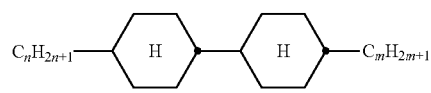

CCH-nm

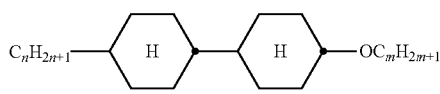

CCH-nOm

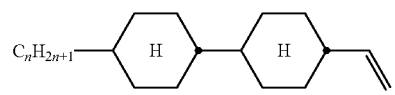

CC-n-V

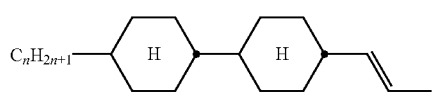

CC-n-V1

TABLE A-continued
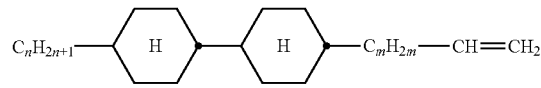
CC-n-mV
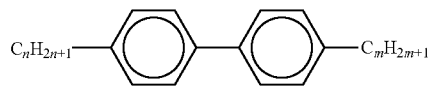
PP-n-m
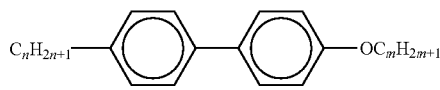
PP-n-Om
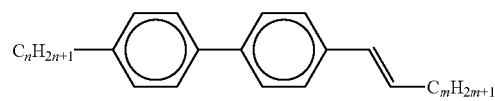
PP-n-Vm
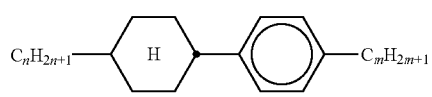
PCH-nm
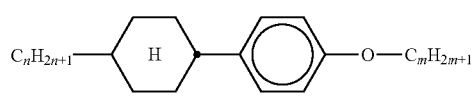
PCH-nOm
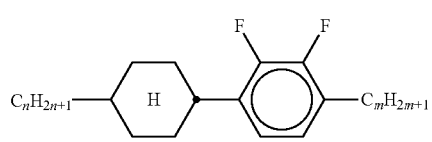
CY-n-Om
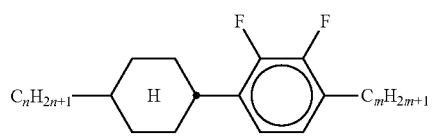
CY-n-m
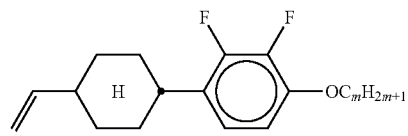
CY-V-Om
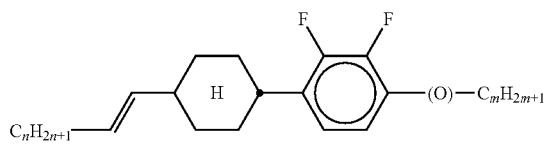
CY-nV-(O)m TABLE A-continued
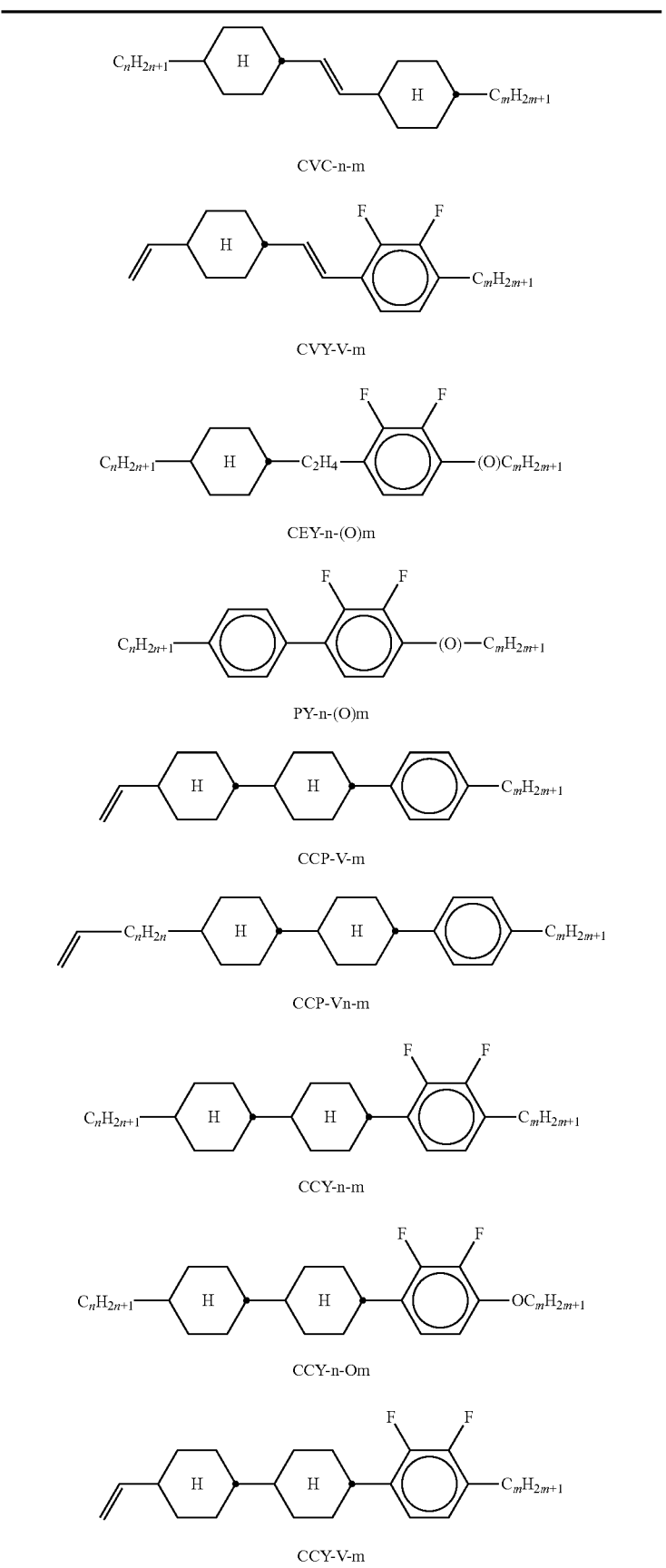

TABLE A-continued
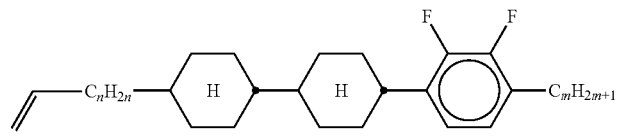
CCY-Vn-m
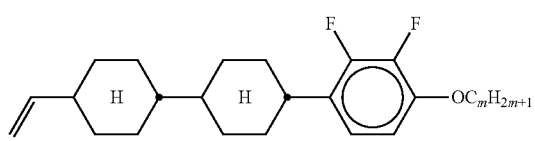
CCY-V-Om
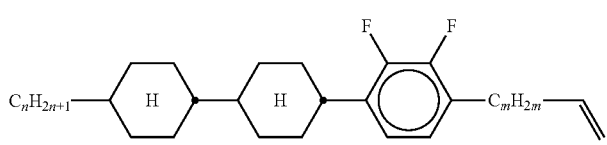
CCY-n-OmV
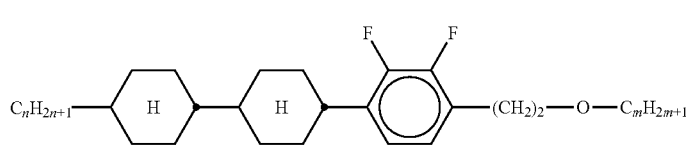
CCY-n-zOm
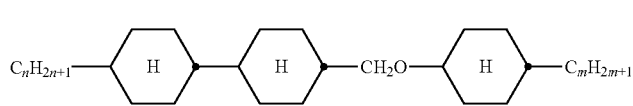
CCOC-n-m
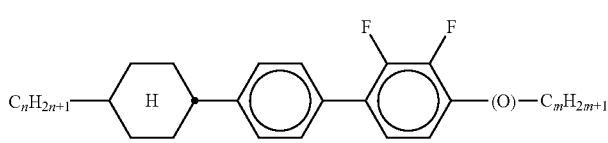
CPY-n-(O)m
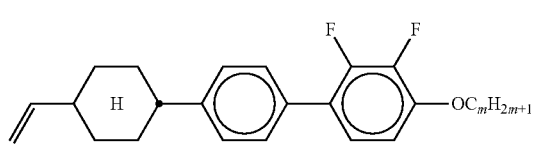
CPY-V-Om
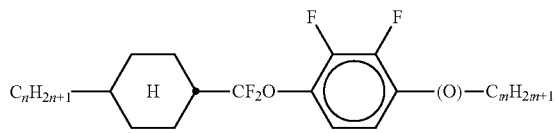
CQY-n-(O)m
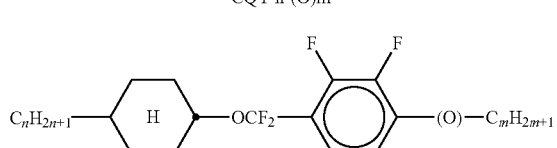
CQIY-n-(O)m TABLE A-continued
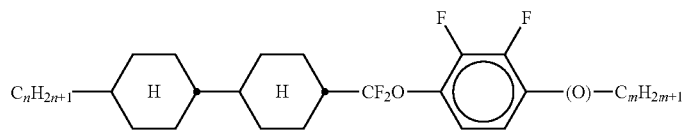
CCQY-n-(O)m
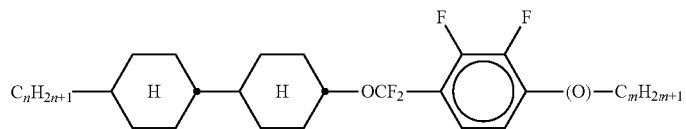
CCQIY-n-(O)m
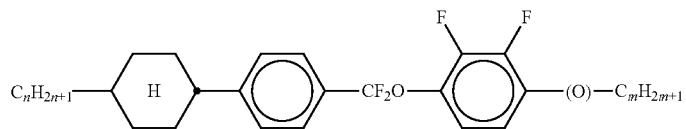
CPQY-n-(O)m
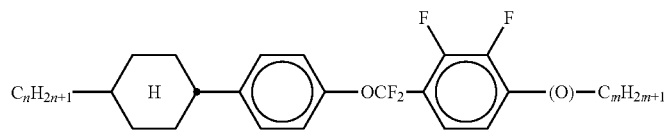
CPQIY-n-Om
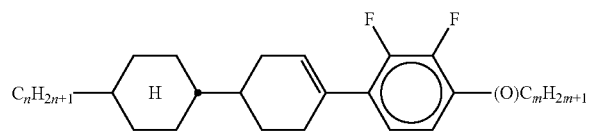
CLY-n-(O)m
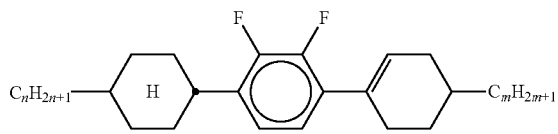
CYLI-n-m
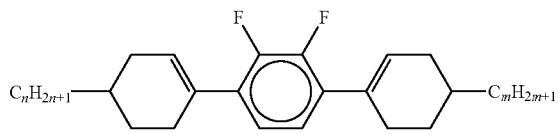
LYLI-n-m
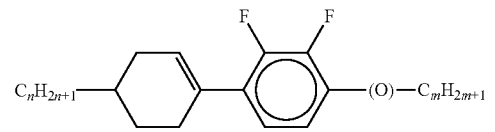
LY-n-(O)m
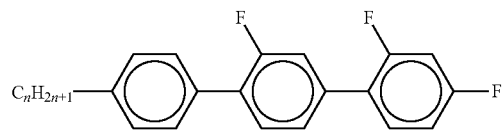
PGIGI-n-F TABLE A-continued
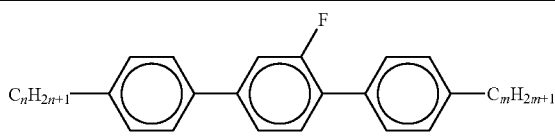
PGP-n-m
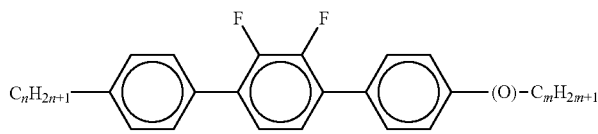
PYP-n-(O)m
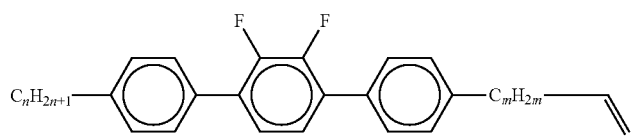
PYP-n-mV
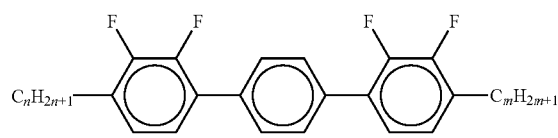
YPY-n-m
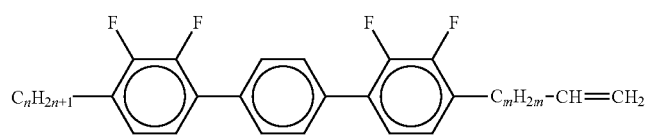
YPY-n-mV
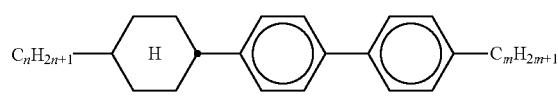
BCH-nm
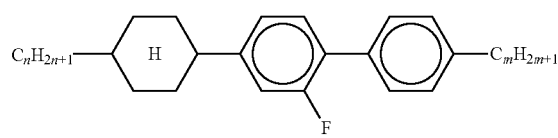
BCH-nmF
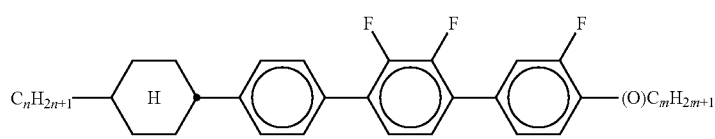
CPYP-n-(O)m
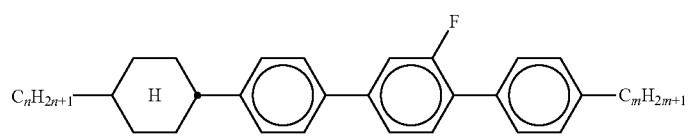
CPGP-n-m TABLE A-continued
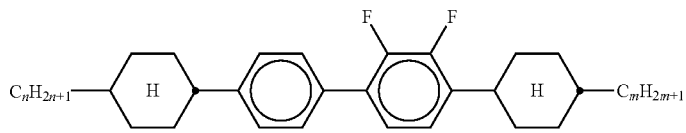
CPYC-n-m
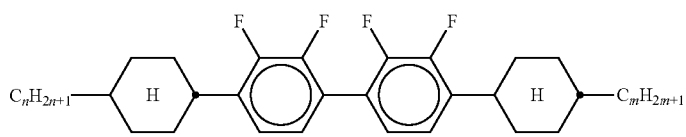
CYYC-n-m
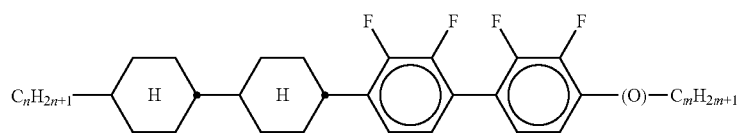
CCYY-n-m
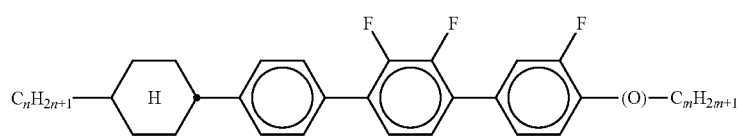
CPYG-n-(O)m
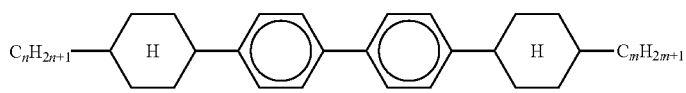
CBC-nm
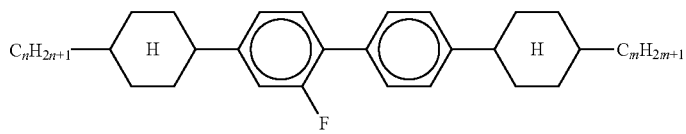
CBC-nmF
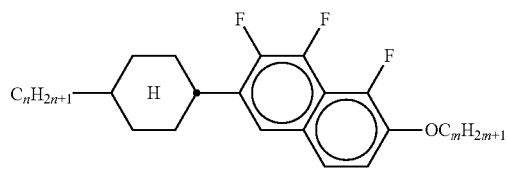
CNap-n-Om
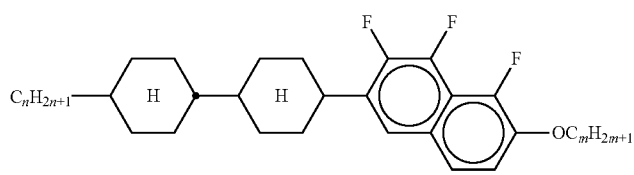
CCNap-n-Om TABLE A-continued

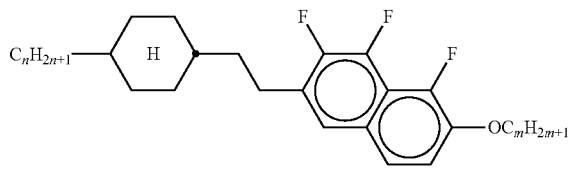

CENap-n-Om

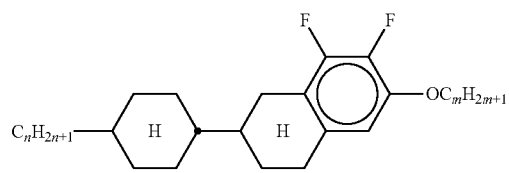

CTNap-n-Om

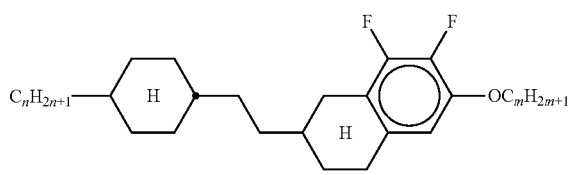

CETNap-n-Om

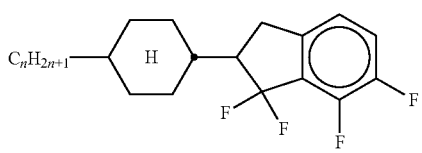

CK-n-F

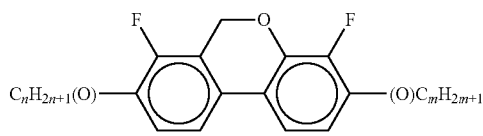

DFDBC-n(O)-(O)m

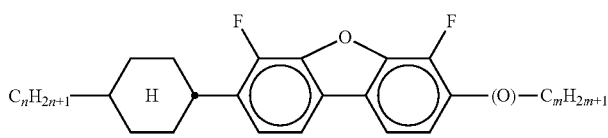

C-DFDBF-n-(O)m

In a preferred embodiment of the present invention, the LC media according to the invention comprise one or more compounds selected from the group consisting of compounds from Table A.

Table B shows possible chiral dopants which can be added to the LC media according to the invention.

TABLE B

TABLE B shows possible chrial dopants which can be added to the LC media according to the invention.

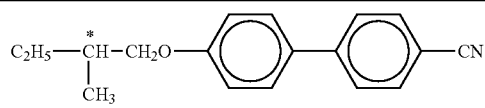

C 15

TABLE B-continued
TABLE B shows possible chrial dopants which can be added to the LC media according to the invention.
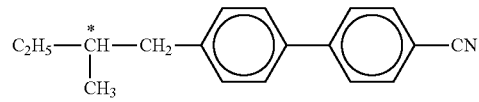
CB 15
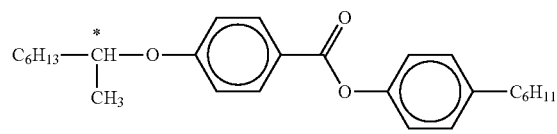
CM 21
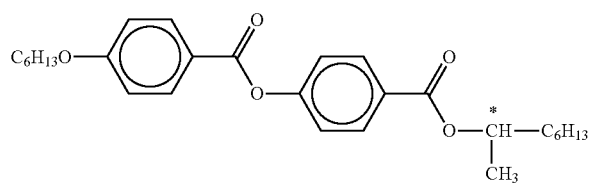
R/S-811
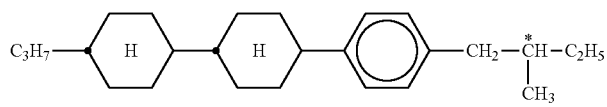
CM 44
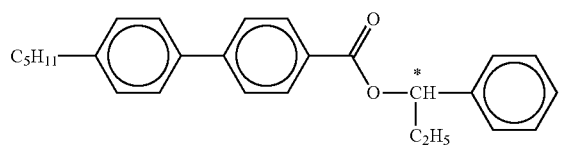
CM 45
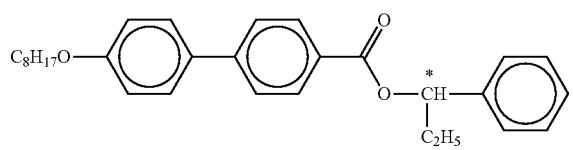
CM 47
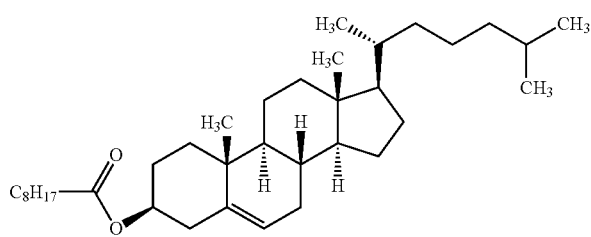
CN

TABLE B-continued

TABLE B shows possible chrial dopants which can be added to the LC media according to the invention.

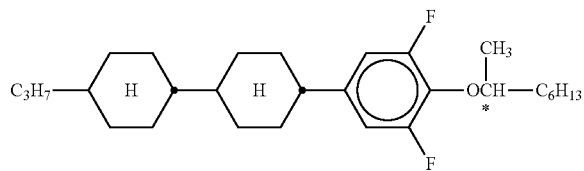

R/S-2011

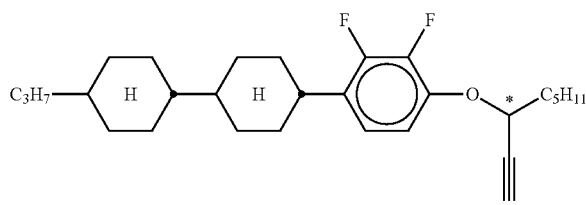

R/S-3011

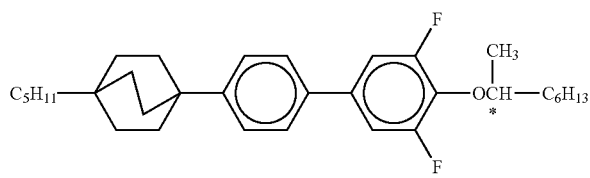

R/S-4011

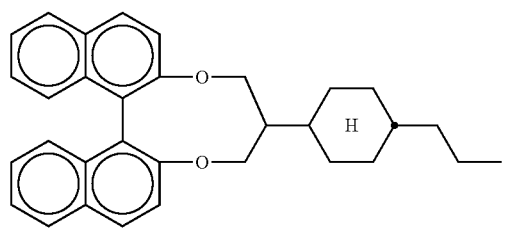

R/S-5011

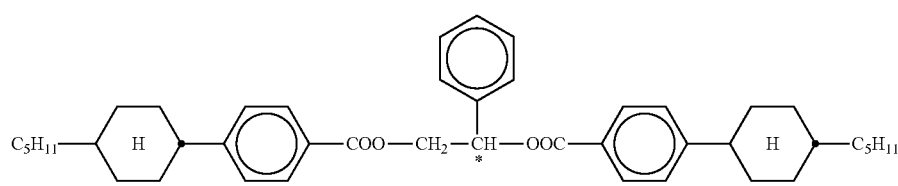

R/S-1011

The LC media preferably comprise 0 to 10%, in particular 0.01 to 5% and particularly preferably 0.1 to 3%, of dopants. The LC media preferably comprise one or more dopants selected from the group consisting of compounds from Table B.

Table C shows possible stabilisers which can be added to the LC media according to the invention.

(n here denotes an integer from 1 to 12)

TABLE C
TABLE C shows possible stabilisers which can be added to the LC media according to the invention.
(n here denotes an integer from 1 to 12)
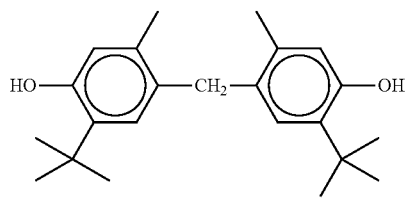
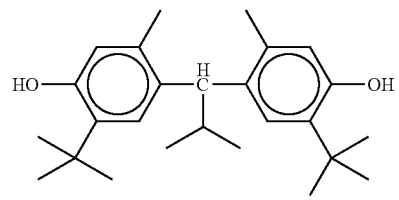
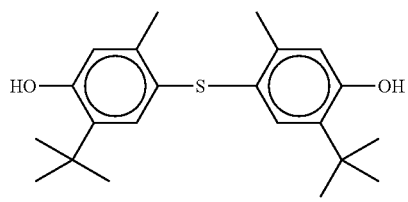
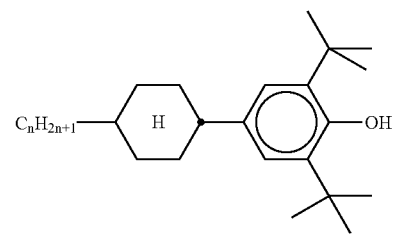
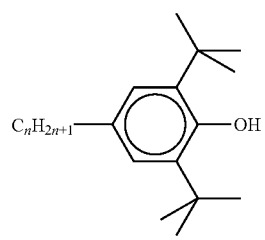
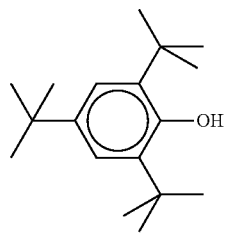
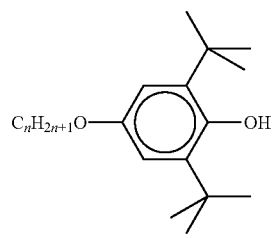

TABLE C-continued
TABLE C shows possible stabilisers which can be added to the LC media according to the invention.
(n here denotes an integer from 1 to 12)
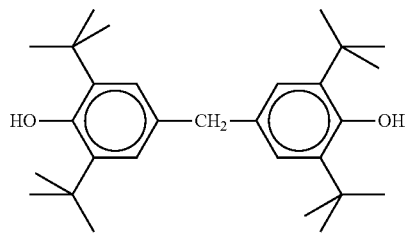
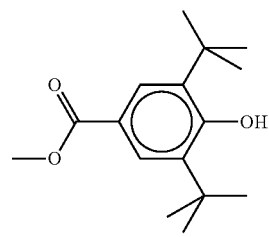
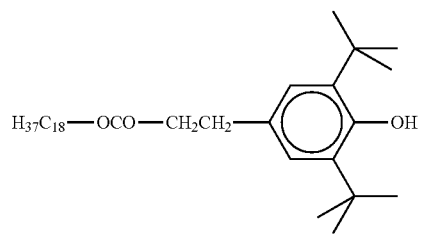
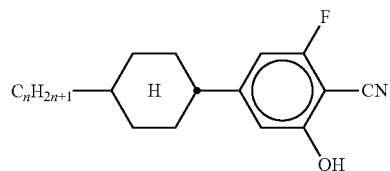
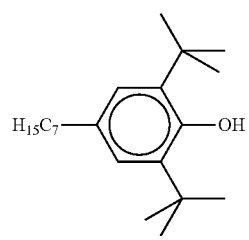
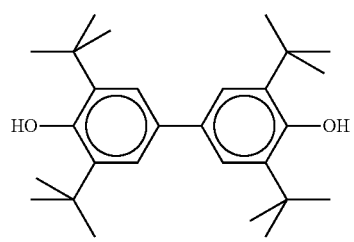

TABLE C-continued
TABLE C shows possible stabilisers which can be added to the LC media according to the invention.
(n here denotes an integer from 1 to 12)
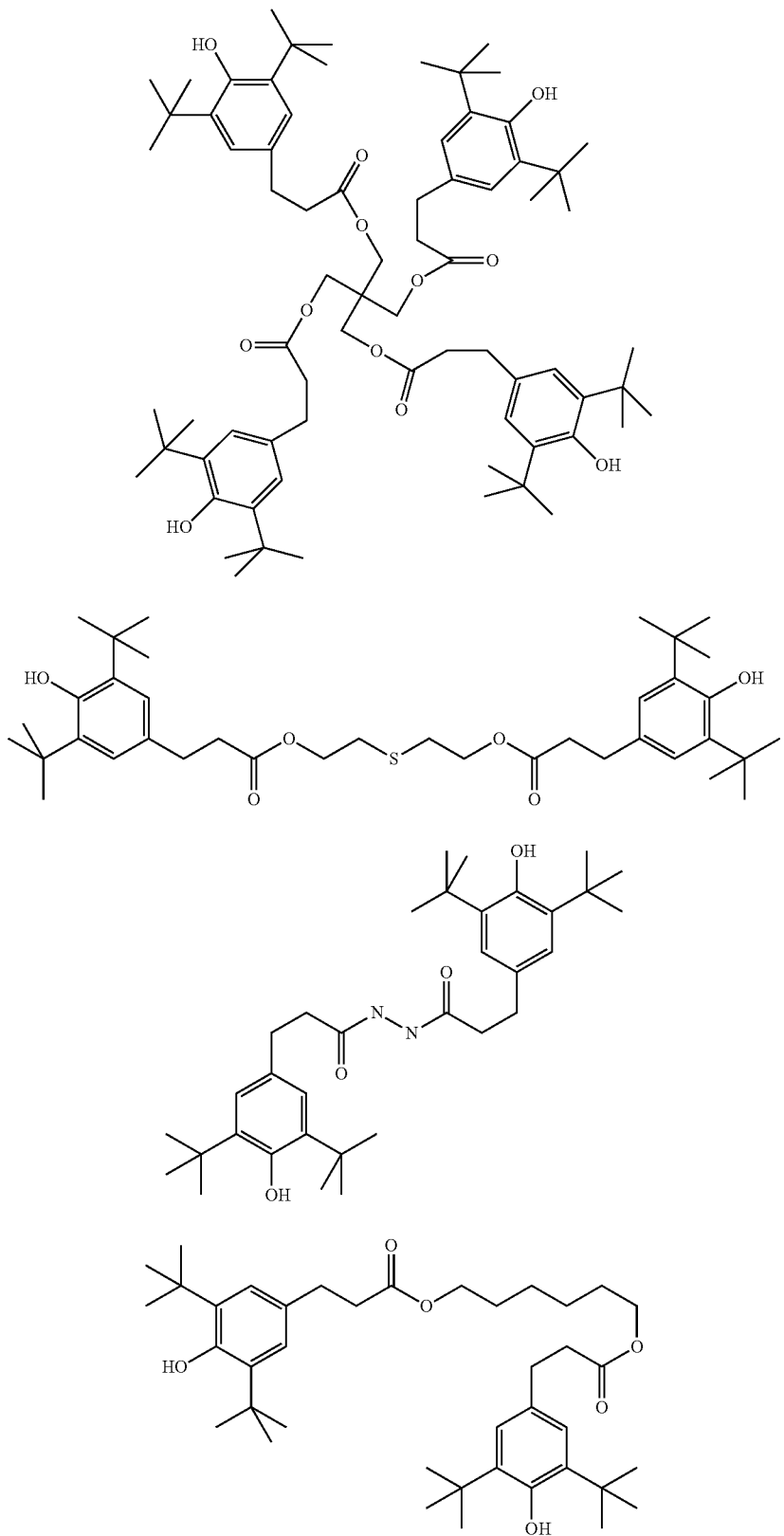

TABLE C-continued
TABLE C shows possible stabilisers which can be added to the LC media according to the invention.
(n here denotes an integer from 1 to 12)
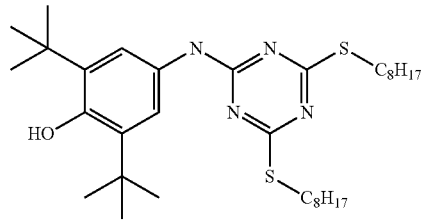
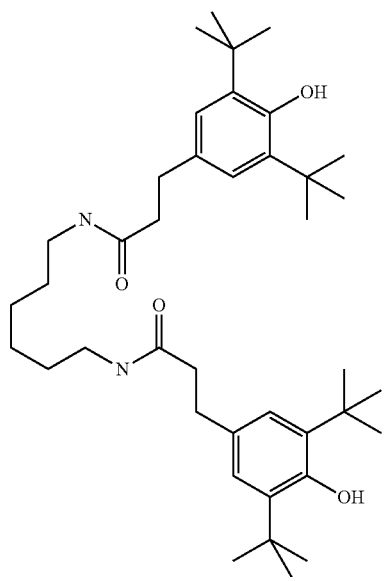 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
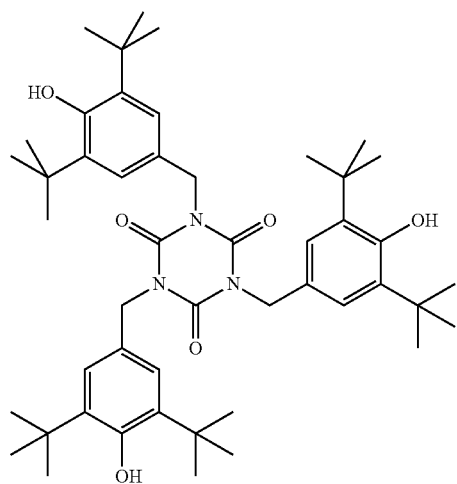 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
TABLE C shows possible stabilisers which can be added to the LC media according to the invention.
(n here denotes an integer from 1 to 12)
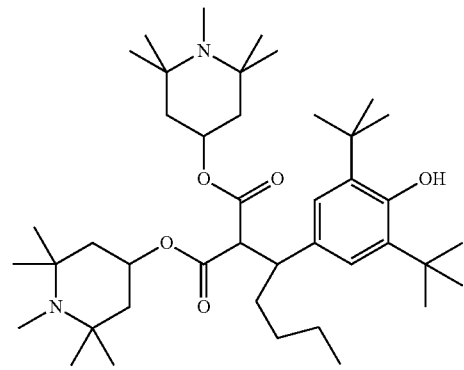 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
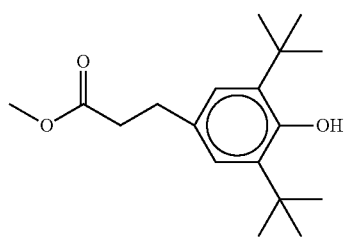
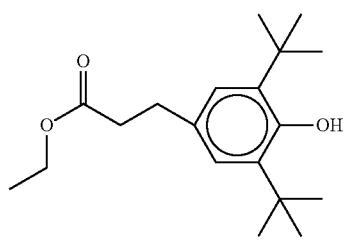
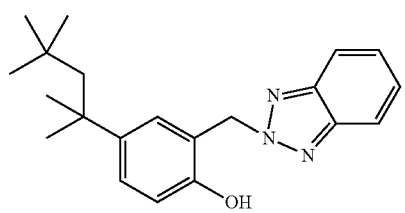 [SMILES: CC(C)(C)CC(C)(C)c1ccc(O)c(Cn2nc3ccccc3n2)c1]
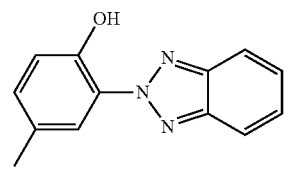 [SMILES: Cc1ccc(O)c(-n2nc3ccccc3n2)c1]
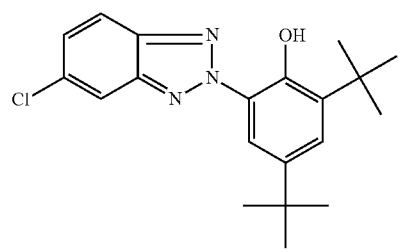 [SMILES: CC(C)(C)c1cc(-n2nc3ccc(Cl)cc3n2)c(O)c(C(C)(C)C)c1]

TABLE C-continued
TABLE C shows possible stabilisers which can be added to the LC media according to the invention.
(n here denotes an integer from 1 to 12)
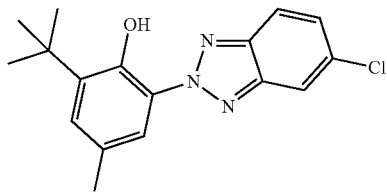 [SMILES: Cc1cc(-n2nc3ccc(Cl)cc3n2)c(O)c(C(C)(C)C)c1]
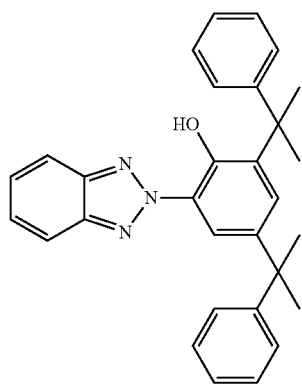 [SMILES: CC(C)(c1ccccc1)c1cc(-n2nc3ccccc3n2)c(O)c(C(C)(C)c2ccccc2)c1]
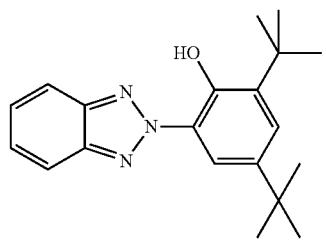 [SMILES: CC(C)(C)c1cc(-n2nc3ccccc3n2)c(O)c(C(C)(C)C)c1]
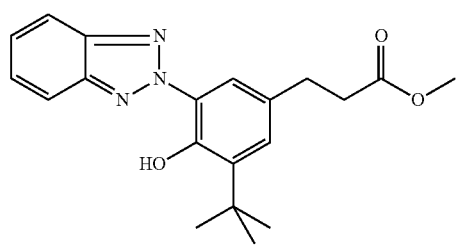 [SMILES: COC(=O)CCc1cc(-n2nc3ccccc3n2)c(O)c(C(C)(C)C)c1]
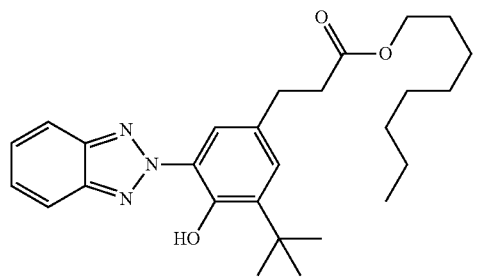 [SMILES: CCCCCCCCOC(=O)CCc1cc(-n2nc3ccccc3n2)c(O)c(C(C)(C)C)c1]

TABLE C-continued
TABLE C shows possible stabilisers which can be added to the LC media according to the invention.
(n here denotes an integer from 1 to 12)
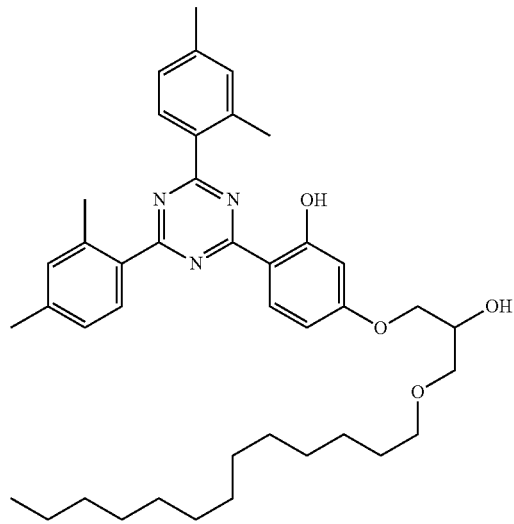 [SMILES: CCCCCCCCCCCCCOCC(O)COc1ccc(-c2nc(-c3ccc(C)cc3C)nc(-c3ccc(C)cc3C)n2)c(O)c1]
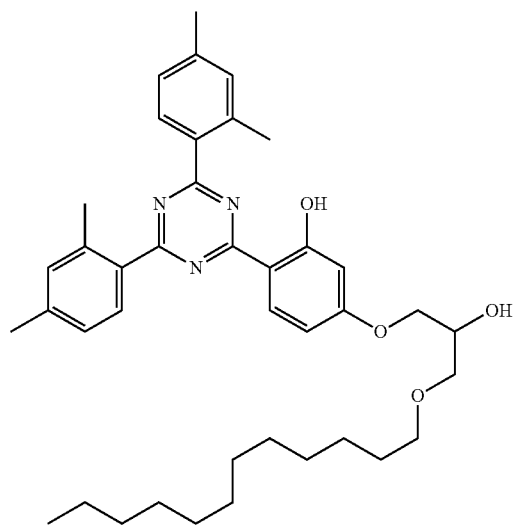
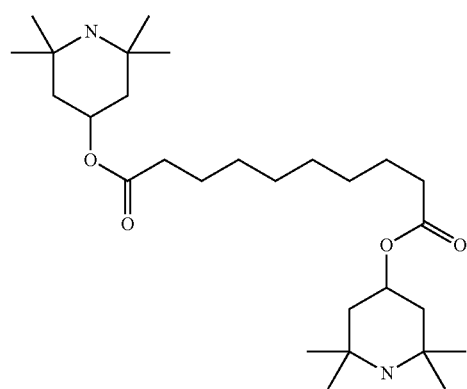

TABLE C-continued

TABLE C shows possible stabilisers which can be added to the LC media according to the invention.
(n here denotes an integer from 1 to 12)

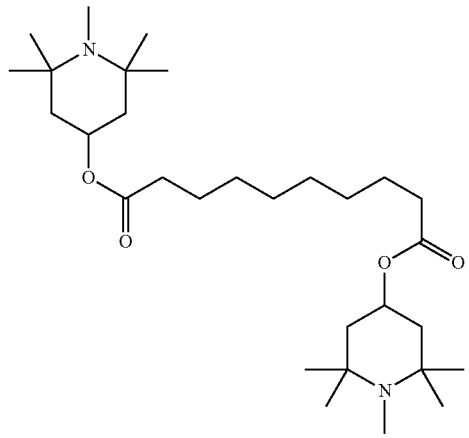

The LC media preferably comprise 0 to 10%, in particular 1 ppm to 5% and particularly preferably 1 ppm to 1%, of stabilisers. The LC media preferably comprise one or more stabilisers selected from the group consisting of compounds from Table C.

In addition, the following abbreviations and symbols are used:
$V_0$ threshold voltage, capacitive [V] at 20° C.,
$n_e$ extraordinary refractive index at 20° C. and 533 nm,
$n_o$ ordinary refractive index at 20° C. and 589 nm,
Δn optical anisotropy at 20° C. and 589 nm,
$\in_\perp$ dielectric susceptibility perpendicular to the director at 20° C. and 1 kHz,
$\in_\parallel$ dielectric susceptibility parallel to the director at 20° C. and 1 kHz,
Δ∈ dielectric anisotropy at 20° C. and 1 kHz,
cl.p., T(N,I) clearing point [° C.],
$\gamma_1$ rotational viscosity at 20° C. [pN],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase), determined in test cells,
$HR_{20}$ voltage holding ratio at 20° C. [%], and
$HR_{100}$ voltage holding ratio at 100° C. [%].

Unless explicitly noted otherwise, all concentrations and % values (with the exception of the values for HR, contrast and transmission) in the present application are indicated in percent by weight and relate to the corresponding mixture as a whole comprising all solid or liquid-crystalline components, without solvent.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.). m.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ at 1 kHz, unless explicitly indicated otherwise in each case.

The term "threshold voltage" for the present invention relates to the capacitive threshold ($V_0$), also called the Freedericks threshold, unless explicitly indicated otherwise, in the examples, as generally usual, the optical threshold for 10% relative contrast ($V_{10}$) may also be indicated.

The display used for measurement of the capacitive threshold voltage consists of two plane-parallel glass outer plates at a separation of 20 µm, each of which has, on the inside, an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 µm, each of which has, on the inside, an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light for a pre-specified time, with a voltage simultaneously being applied to the display (usually 10 V to 30 V alternating current, 1 kHz). In the examples, unless indicated otherwise, a 28 mW/cm² mercury vapour lamp is used, and the intensity is measured using a standard UV meter (Ushio UNI meter) fitted with a 365 nm band-pass filter.

The tilt angle is determined by rotational crystal experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host, mixture, and the resultant mixture is introduced into TN-VHR test cells (rubbed at 90°, TN-polyimide alignment layer, layer thickness d≈4 µm). The HR value is determined after 5 min at 100× before and after UV exposure for 2 h (sun test) at 1 V, 50 Hz, 64 µs pulse (measuring instrument: Autronic-Melchers VHRM-105).

EXAMPLE 1

Nematic 1 g mixture N1 according to the invention is formulated as follows:

| | | | |
|---|---|---|---|
| CEY-3-O2 | 15.00% | cl.p. | +70.5 |
| CEY-5-O2 | 15.00% | Δn | 0.0869 |
| CPY-3-O2 | 11.00% | Δε | −2.9 |
| CPY-2-O2 | 11.00% | ε∥ | 3.4 |
| III a | 3.00% | $K_3/K_1$ | 0.92 |
| CCH-25 | 15.00% | $\gamma_1$ | 115 |
| CCH-23 | 10.00% | $V_0$ | 2.33 |
| CCH-34 | 10.00% | | |
| CCP-3-1 | 5.00% | | |
| CCP-3-3 | 5.00% | | |

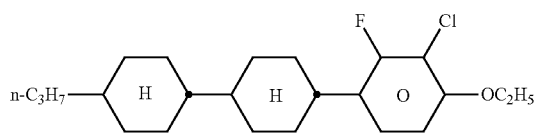

III a

EXAMPLE 2

Nematic LC mixture N2 according to the invention is formulated as follows:

| | | | |
|---|---|---|---|
| CY-3-O4 | 14.00% | cl.p. | +82.0 |
| CEY-3-O2 | 12.00% | Δn | 0.1312 |
| CCY-3-O2 | 10.00% | Δε | −3.8 |
| CPY-2-O2 | 12.00% | ε∥ | 3.9 |
| CPY-3-O2 | 12.00% | $K_3/K_1$ | 1.20 |
| BCH-32 | 12.00% | $\gamma_1$ | 199 |
| CCH-34 | 9.00% | $V_0$ | 2.21 |
| PCH-301 | 8.00% | | |
| PGIGI-3-F | 11.00% | | |

EXAMPLE 3

Nematic LC mixture N3 according to the invention is formulated as follows:

| | | | |
|---|---|---|---|
| CY-3-O2 | 14.00% | cl.p. | +80.5 |
| CEY-3-O2 | 10.00% | Δn | 0.0852 |
| CCY-3-O2 | 11.00% | Δε | −3.8 |
| CCY-3-O3 | 12.00% | ε∥ | 3.5 |
| CCY-4-O2 | 8.00% | $K_3/K_1$ | 1.07 |
| CPY-2-O2 | 3.00% | $\gamma_1$ | 133 |
| CPY-3-O2 | 5.00% | $V_0$ | 2.14 |
| CCH-34 | 18.00% | | |
| CCH-35 | 9.00% | | |
| PCH-301 | 10.00% | | |

EXAMPLE 4

For comparative purposes, nematic LC mixture V1 is formulated as follows:

| | | | |
|---|---|---|---|
| CY-3-O2 | 16.00% | cl.p. | +71.0 |
| CY-5-O2 | 14.00% | Δn | 0.0822 |
| CCY-3-O2 | 12.00% | Δε | −3.8 |
| CCY-5-O2 | 11.00% | ε∥ | 3.6 |
| CCY-2-1 | 9.00% | $K_3/K_1$ | 1.16 |
| CCY-3-1 | 8.00% | $\gamma_1$ | 133 |
| CCH-34 | 8.00% | $V_0$ | 2.10 |
| CCH-35 | 9.00% | | |
| PCH-53 | 7.00% | | |
| PCH-301 | 6.00% | | |

0.3% of RM1 (biphenyl 4,4'-dimethacrylate) is added to each of LC mixtures N1, N2 and N3 according to the invention and comparative mixture V1:

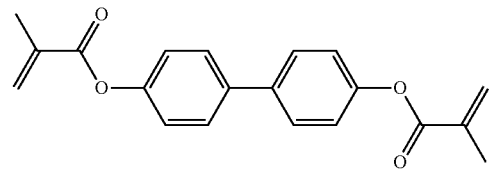

RM1

The resultant mixture is introduced into VA e/o test cells as described above. The cells are irradiated with UV light (365 nm) having an intensity of 50 mW/cm² for various times with application of a voltage of 24 V (alternating current), causing polymerisation of the RM.

For each test cell, the pretilt angle is determined as indicated above. The pretilt angle achieved in each case for various exposure times is shown in Table 1.

TABLE 1

| Mixture | Exposure time [s] | Tilt [°] |
|---|---|---|
| V1 + RM1 | 0 | 89.3 |
| | 60 | 88.9 |
| | 120 | 86.6 |
| | 240 | 82.0 |
| | 360 | 79.6 |
| N1 + RM1 | 0 | 89.5 |
| | 60 | 87.5 |
| | 120 | 83.9 |
| | 240 | 80.2 |
| | 360 | 77.1 |
| N2 + RM1 | 120 | 84.0 |
| N3 + RM1 | 120 | 83.2 |

As can be seen from Table 1, lower pretilt angles can be achieved with LC media according to the invention comprising an LC mixture N1, N2 or N3 according to the invention than with the LC medium comprising comparative mixture V1. Table 1 also shows that comparable pretilt angles are achieved after a significantly shorter exposure time with LC media according to the invention than with the LC medium comprising comparative mixture V1.

The invention claimed is:

1. A liquid-crystal composition comprising at least the following three components:
one or more compounds of formula I

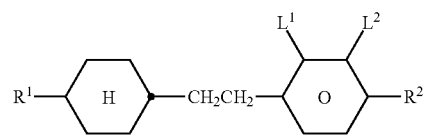

I in which
R¹ and R² each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another, and
L¹ and L² each, independently of one another, denote F, Cl, OCF₃, CF₃, CH₂F, or CHF₂;

one or more polymerizable compounds of formula I*

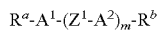

in which
R$^a$ and R$^b$ each, independently of one another, denote P, P-Sp-, H, halogen, SF$_5$, NO$_2$, a carbon group or hydrocarbon group, where at least one of the radicals R$^a$ and R$^b$ denotes or contains a group P or P-Sp-,
P, on each occurrence, identically or differently, denotes a polymerizable group,
Sp, on each occurrence, identically or differently, denotes a spacer group or a single bond,
A$^1$ and A$^2$ each, independently of one another, denote an aromatic, heteroaromatic, alicyclic or heterocyclic group, which may also contain fused rings, and which may also be mono- or polysubstituted by L,
L denotes P-Sp-, H, OH, CH$_2$OH, halogen, SF$_5$, NO$_2$, a carbon group or hydrocarbon group,
Z$^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —F=CF—, —C≡C—, —CH=CH—COO—, —OCO—CH=CH—, CR$^0$R$^{00}$ or a single bond,
R$^0$ and R$^{00}$ each, independently of one another, denote H or alkyl having 1 to 12 C atoms,
m denotes 0, 1, 2, 3 or 4, and
n1 denotes 1, 2, 3 or 4;
and
at least one compound of formula ZK or CC-n-V:

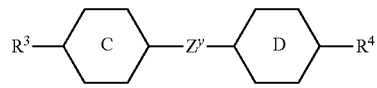

in which

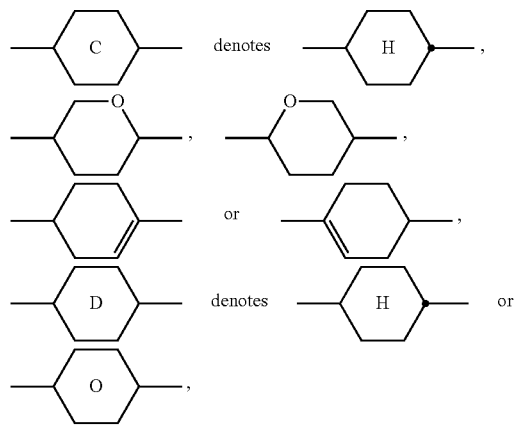

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, and
Z$^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O— or a single bond,

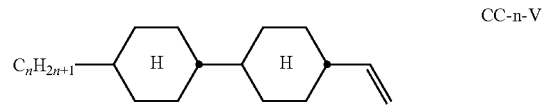

wherein n is 1, 2, 3, 4, 5 or 6.

2. A liquid crystal composition according to claim 1, wherein the LC mixture further comprises one or more compounds of formula II and/or III:

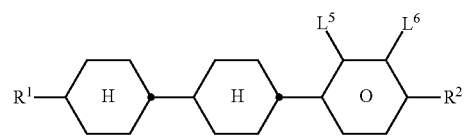

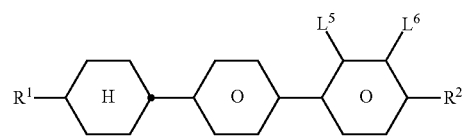

in which
R$^1$ and R$^2$ each, independently of one another, denote alkyl having 1 to 12 C atoms, in which one or two non-adjacent CH$_2$ groups may be replaced by —O—, —CH=CH—, —CO—, —OCO— or —COO— in such a way that O atoms are not linked directly to one another, and
one of the radicals L$^5$ and L$^6$ denotes F and the other denotes Cl.

3. A liquid crystal composition according to claim 1, wherein the LC mixture further comprises one or more compounds of formula IV:

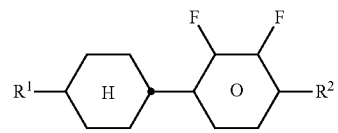

in which
R$^1$ and R$^2$ each, independently of one another, denote alkyl having 1 to 12 C atoms, in which one or two non-adjacent CH$_2$ groups may be replaced by —O—, —CH=CH—, —CO—, —OCO— or —COO— in such a way that O atoms are not linked directly to one another.

4. A liquid crystal composition according to claim 1, wherein the LC mixture further comprises one or more compounds of formula V:

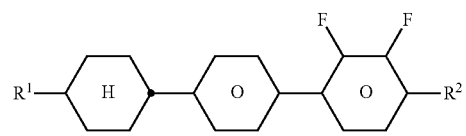

in which

R¹ and R² each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another.

5. A liquid crystal composition according to claim 1, wherein the LC mixture further comprises one or more compounds of formula VI:

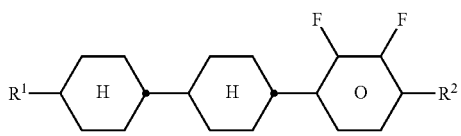

VI in which

R¹ and R² each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another.

6. A liquid crystal composition according to claim 1, wherein the LC mixture comprises 5 to 50% of one or more compounds of formula I.

7. A liquid crystal composition according to claim 2, wherein the LC mixture comprises one or more compounds of formulae II and III in a total concentration of 1 to 20%.

8. A liquid crystal composition according to claim 3, wherein the LC mixture comprises one or more compounds of formulae I and IV in a total concentration of ≥10%.

9. A liquid crystal composition according to claim 4, wherein the LC mixture comprises one or more compounds of formulae I and V in a total concentration of ≥20%.

10. A liquid crystal composition according to claim 5, wherein the LC mixture comprises one or more compounds of formula I and one or more compounds of formula V and one or more compounds of the formula VI in a total concentration of ≥25%, wherein formula V is

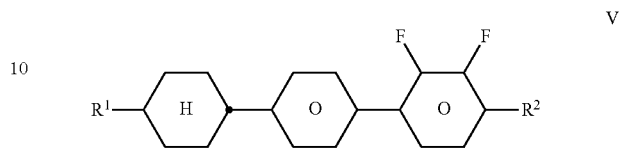

V in which

R¹ and R² each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another.

11. A liquid crystal composition according to claim 1, wherein the concentration of the polymerizable compound of formula I* is ≤5% and ≥0.01%.

12. A liquid crystal composition according to claim 1, further comprising a polymerization initiator.

13. A liquid crystal composition according to claim 1, wherein the composition has a nematic phase range of at least 80° K, a negative dielectric anisotropy, Δε, of −0.5 to −10, and a birefringence, Δn, between 0.06 and 0.14, in particular between 0.07 and 0.12.

14. A PS (polymer stabilized) or PSA (polymer sustained alignment) liquid crystal display comprising a liquid crystal composition according to claim 1.

15. A liquid crystal display according to claim 13, which is a PSA-VA, PS-IPS or PS-FFS display.

* * * * *